US012373415B2

(12) United States Patent
He et al.

(10) Patent No.: US 12,373,415 B2
(45) Date of Patent: Jul. 29, 2025

(54) SYNTHESIZING TRANSFORMATIONS TO RELATIONALIZE DATA TABLES

(71) Applicant: Microsoft Technology Licensing, LLC, Redmond, WA (US)

(72) Inventors: Yeye He, Bellevue, WA (US); Cong Yan, Issaquah, WA (US); Yue Wang, Redmond, WA (US); Surajit Chaudhuri, Kirkland, WA (US); Peng Li, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/207,050

(22) Filed: Jun. 7, 2023

(65) Prior Publication Data

US 2024/0411740 A1      Dec. 12, 2024

(51) Int. Cl.
*G06F 16/22*     (2019.01)
*G06F 16/21*     (2019.01)

(52) U.S. Cl.
CPC .......... *G06F 16/2282* (2019.01); *G06F 16/21* (2019.01)

(58) Field of Classification Search
CPC .............................. G06F 16/2282; G06F 16/21
USPC ........................................................ 707/609
See application file for complete search history.

(56) References Cited

U.S. PATENT DOCUMENTS

| | | | | |
|---|---|---|---|---|
| 6,714,943 B1 * | 3/2004 | Ganesh | ............ | G06F 16/24565 |
| 7,028,057 B1 * | 4/2006 | Vasudevan | ............ | G06F 16/219 |
| | | | | 707/999.203 |
| 7,287,216 B1 * | 10/2007 | Lee | ............ | G06F 16/86 |
| | | | | 707/999.003 |
| 7,801,886 B1 * | 9/2010 | Gabriel | ............ | G06F 16/20 |
| | | | | 707/715 |
| 8,417,715 B1 * | 4/2013 | Bruckhaus | ............ | G06Q 10/04 |
| | | | | 705/26.1 |
| 11,256,485 B2 * | 2/2022 | Shi | ............ | G06N 5/04 |

(Continued)

FOREIGN PATENT DOCUMENTS

| | | |
|---|---|---|
| CN | 112052414 A | 12/2020 |
| EP | 1686498 A2 | 8/2006 |

OTHER PUBLICATIONS

"Auto Tables-Supp-Materials-for-Review", Retrieved from: https://1drv.ms/u/s!AkvY8ho1gepOicQ5-x0l4_-Smn5CuQ?e=6F8ue7, Retrieved Date: Feb. 28, 2023, 1 Page.

(Continued)

*Primary Examiner* — Joshua Bullock
(74) *Attorney, Agent, or Firm* — Rainier Patents, P.S.

(57) ABSTRACT

This document relates to relational databases and corresponding data tables. Non-conforming data tables can be automatically transformed into conforming relational data tables. One example can obtain conforming relational data tables and can generate training data without human labelling by identifying a transformational operator that will transform an individual conforming relational data table to a non-conforming data table and an inverse transformational operator that will transform the non-conforming data table back to the individual conforming relational data table. The example can train a model with the training data. The trained model can synthesize programs to transform other non-conforming data tables to conforming relational data tables.

21 Claims, 15 Drawing Sheets

(56) References Cited

U.S. PATENT DOCUMENTS

| | | | |
|---|---|---|---|
| 2004/0024790 | A1 | 2/2004 | Everett |
| 2016/0179869 | A1* | 6/2016 | Hutchins ............... G06F 16/211 |
| | | | 707/703 |
| 2019/0014151 | A1* | 1/2019 | Firke .................. H04L 63/0823 |
| 2019/0258942 | A1 | 8/2019 | Gu et al |
| 2020/0175390 | A1* | 6/2020 | Conti ..................... G06F 40/30 |
| 2021/0019125 | A1* | 1/2021 | Shi ........................... G06N 5/04 |
| 2022/0067048 | A1 | 3/2022 | Mohan |
| 2022/0343444 | A1* | 10/2022 | Chan ..................... G06F 16/353 |
| 2023/0236587 | A1* | 7/2023 | Yang ................. G05B 19/4184 |
| | | | 702/185 |

OTHER PUBLICATIONS

"Data Restructuring Using Excel", Retrieved from: https://techcommunity.microsoft.com/t5/excel/data-restructuring-using-excel/m-p/287547, Retrieved Date: Feb. 28, 2023, 9 Pages.

"Foofah: programming-by-example data transformation program synthesizer", Retrieved from: https://github.com/umich-dbgroup/foofah, Apr. 23, 2018, 4 Pages.

"Pandas", Retrieved from: https://pandas.pydata.org/, Retrieved Date: Feb. 28, 2023, 2 Pages.

"Pandas Melt with Multi Index Data Set and Resetting Index—Why is this working?", Retrieved from: https://stackoverflow.com/questions/53917303/pandas-melt-with-multi-index-data-set-and-resetting-index-why-is-this-working, Retrieved Date: Feb. 28, 2023, 4 Pages.

"Pandas Melt with Multiple Value Vars", Retrieved from: https://stackoverflow.com/questions/45066873/pandas-melt-with-multiple-value-vars, Retrieved Date: Feb. 28, 2023, 4 Pages.

"pandas.DataFrame.explode", Retrieved from: https://pandas.pydata.org/docs/reference/api/pandas.DataFrame.explode.html, Retrieved Date: Feb. 28, 2023, 2 Pages.

"pandas.DataFrame.pivot", Retrieved from: https://pandas.pydata.org/docs/reference/api/pandas.DataFrame.pivot.html, Retrieved Date: Feb. 28, 2023, 3 Pages.

"pandas.DataFrame.stack", Retrieved from: https://pandas.pydata.org/docs/reference/api/pandas.DataFrame.stack.html, Retrieved Date: Feb. 28, 2023, 3 Pages.

"pandas.DataFrame.transpose", Retrieved from: https://pandas.pydata.org/docs/reference/api/pandas.DataFrame.transpose.html, Retrieved Date: Feb. 28, 2023, 2 Pages.

"pandas.melt", Retrieved from: https://pandas.pydata.org/docs/reference/api/pandas.melt.html, Retrieved Date: Feb. 28, 2023, 2 Pages.

"pandas.wide_to_long", Retrieved from: https://pandas.pydata.org/docs/reference/api/pandas.wide_to_long.html, Retrieved Date: Feb. 28, 2023, 4 Pages.

"Pivot data from wide to long", Retrieved from: https://tidyr.tidyverse.org/reference/pivot_longer.html, Retrieved Date: Feb. 28, 2023, 8 Pages.

"Pivot table issue", Retrieved from: https://techcommunity.microsoft.com/t5/excel/pivot-table-issue/m-p/3015448, Retrieved Date: Feb. 28, 2023, 7 Pages.

"Reshape wide to long in pandas", Retrieved from: https://stackoverflow.com/questions/36537945/reshape-wide-to-long-in-pandas, Retrieved Date: Feb. 28, 2023, 5 Pages.

"Scythe: Synthesizing SQL queries from input output examples.", Retrieved from: https://github.com/Mestway/Scythe, Retrieved Date: Feb. 28, 2023, 2 Pages.

"Simultaneously melt multiple columns in Python Pandas", Retrieved from: https://stackoverflow.com/questions/51519101/simultaneously-melt-multiple-columns-in-python-pandas, Retrieved Date: Feb. 28, 2023, 6 Pages.

"Transposing data for better analysis", Retrieved from: https://techcommunity.microsoft.com/t5/excel/transposing-data-for-better-analysis/m-p/1297106, Retrieved Date: Feb. 28, 2023, 6 Pages.

Barowy, et al., "FlashRelate: extracting relational data from semi-structured spreadsheets using examples", In ACM SIGPLAN Notices 50, Issue 6, Jun. 13, 2015, pp. 218-228.

Bojanowski, et al., "Enriching Word Vectors with Subword Information", In Journal of Transactions of the Association for Computational Linguistics, vol. 5, Jun. 2017, pp. 135-146.

Codd, E. F., "The relational model for database management: version 2", In Publication of Addison-Wesley Longman Publishing Co., Inc, Jan. 1, 1990, 567 Pages.

Deng, et al., "Imagenet: A Large-Scale Hierarchical Image Database", In Proceedings of the IEEE Conference on Computer Vision and Pattern Recognition, Jun. 20, 2009, pp. 248-255.

Deng, et al., "Turl: Table understanding through representation learning", In Proceedings of SIGMOD Record, vol. 51, No. 1, Mar. 2022, pp. 33-40.

Dong, et al., "TableSense: Spreadsheet Table Detection with Convolutional Neural Networks", In Proceedings of the AAAI Conference on Artificial Intelligence, Jul. 17, 2019, pp. 69-76.

Gulwani, et al., "Spreadsheet Data Manipulation Using Examples", In Magazine Communications of the ACM, vol. 55, Issue 8, Aug. 1, 2012, pp. 97-105.

He, et al., "Deep Residual Learning for Image Recognition", In Proceedings of the IEEE Conference on Computer Vision and Pattern Recognition, Jun. 27, 2016, pp. 770-778.

He, et al., "Transform-data-by-example (TDE) an extensible search engine for data transformations", In Proceedings of the VLDB Endowment, vol. 11, Issue 10, Jun. 1, 2018, pp. 1165-1177.

Herzig, et al., "TAPAS: Weakly Supervised Table Parsing via Pre-training", In Repository of arXiv:2004.02349v1, Apr. 5, 2020, 14 Pages.

Ishio, et al., "PATSQL—SQL Synthesizer", Retrieved from: https://github.com/takashi-ishio, Retrieved Date: Feb. 28, 2023, 8 Pages.

Jin, et al., "Foofah: Transforming Data by Example", In Proceedings of the ACM International Conference on Management of Data, May 14, 2017, pp. 683-698.

Kent, William, "A simple guide to five normal forms in relational database theory", In Journal of Communications of the ACM, vol. 26, No. 2, Feb. 1983, pp. 120-125.

Krizhevsky, et al., "Imagenet classification with deep convolutional neural networks", In journal of Communications of the ACM, vol. 60, Issue 6, Jun. 2017, pp. 84-90.

Maddock, David, "Pivot Chart 4 columns, set responses to 4 questions", Retrieved from: https://techcommunity.microsoft.com/t5/user/viewprofilepage/user-id/949996#profile, May 5, 2021, 6 Pages.

Manning, et al., "An Introduction to Information Retrieval", In Publication of Cambridge University Press, Jul. 12, 2008, 581 Pages.

Murphy, Kevin, "Machine Learning: A Probabilistic Perspective", In Publication MIT Press, Sep. 18, 2012, 1098 Pages.

Paszke, et al., "Automatic Differentiation in PyTorch", In Proceedings of 31st Conference on Neural Information Processing Systems, Oct. 28, 2017, 4 Pages.

Pennington, et al., "GloVe: Global Vectors for Word Representation", In Proceedings of Conference on Empirical Methods in Natural Language Processing, Oct. 25, 2014, pp. 1532-1543.

Reimers, et al., "Sentence-BERT: Sentence Embeddings using Siamese BERT-Networks", In Proceedings of the 2019 Conference on Empirical Methods in Natural Language Processing and the 9th International Joint Conference on Natural Language Processing, Aug. 27, 2019, pp. 3982-3992.

Shorten, et al., "A survey on image data augmentation for deep learning", In Journal of Journal of big data vol. 6, Issue 1, Dec. 2019, 48 Pages.

Simonyan, et al., "Very Deep Convolutional Networks for Large-Scale Image Recognition", In repository of arXiv:1409.1556v5, Dec. 23, 2014, 13 Pages.

Takenouchi, et al., "PATSQL: effcient synthesis of SQL queries from example tables with quick inference of projected columns", In Repository of arXiv:2010.05807v1, Oct. 12, 2020, 11 Pages.

Tran, et al., "Query by Output", In Proceedings of the ACM SIGMOD International Conference on Management of Data, Jun. 29, 2009, pp. 535-548.

(56) References Cited

OTHER PUBLICATIONS

Wang, et al., "Synthesizing Highly Expressive SQL Queries from Input-Output Examples", In Proceedings of the 38th ACM SIGPLAN Conference on Programming Language Design and Implementation, Jun. 18, 2017, pp. 452-466.

Wang, et al., "TUTA: Tree-based Transformers for Generally Structured Table Pre-training", In Proceedings of the 27th ACM SIGKDD Conference on Knowledge Discovery & Data Mining, Aug. 2021, pp. 1780-1790.

Yan, et al., "Auto-Suggest: Learning-to-Recommend Data Preparation Steps using Data Science Notebooks", In Proceedings of the ACM SIGMOD International Conference on Management of Data, Jun. 11, 2020, pp. 1539-1554.

Yin, et al., "TABERT: Pretraining for Joint Understanding of Textual and Tabular Data", In Repository of arXiv:2005.08314v1, May 17, 2020, 15 Pages.

Zhang, "Automatically synthesizing SQL queries from input-output examples", In Proceedings of 28th IEEE/ACM International Conference on Automated Software Engineering (ASE), Nov. 11, 2013, pp. 224-234.

"Bee-Synth/Bee", Retrieved from internet URL: https://github.com/BEE-Synth/Bee/tree/291a824622e36fccfa43461e85be3f836e3f4eff/Eval/Benchmarks/Spreadsheet/flashrelate-01, 2 pages.

"Power Query—Data Cleaning (Unpivot, Transpose,etc)", Microsoft 365, Retrieved from internet URL: https://techcommunity.microsoft.com/t5/excel/power-query-data-cleaning-unpivot-transpose-etc/m-p/2400300, May 31, 2021, 7 Pages.

"Unpivot grouped data", Microsoft 365, Retrieved from Internet URL: https://techcommunity.microsoft.com/t5/excel/unpivot-grouped-data/m-p/3686239, Nov. 29, 2022, 5 pages.

"UnPivot Monthly Data", Microsoft 365, Retrieved from internet URL: https://techcommunity.microsoft.com/t5/excel/unpivot-monthly-data/m-p/1867836, Nov. 9, 2020, 8 pages.

Brown, et al., "Language Models are Few-Shot Learners", arXiv preprint arXiv:2005.14165, Jul. 22, 2020, 75 pages.

Gao, et al., "Navigating the Data Lake with Datamaran: Automatically Extracting Structure from Log Datasets", SIGMOD '18: Proceedings of the 2018 International Conference on Management of Data, May 27, 2018, pp. 943-958.

International Search Report and Written Opinion received for PCT Application No. PCT/US2024/031519, Sep. 6, 2024, 15 pages.

Jin, et al., "Auto-transform: learning-to-transform by patterns", Proceedings of the VLDB Endowment, vol. 13, Issue 12, Jul. 1, 2020, pp. 2368-2381.

John CNL, "Excel—Ideas feature! ", Microsoft, Retrieved from internet URL: https://answers.microsoft.com/en-us/msoffice/forum/all/excel-ideas-feature/c9574cf9-dccc-4356-95d3-07d268e39d82, Jul. 12, 2024, 7 pages.

Koehler, et al., "Incorporating Data Context to Cost-Effectively Automate End-to-End Data Wrangling", IEEE Transactions on Big Data, vol. 7, Issue 1, Apr. 15, 2019, pp. 169-186.

Li, et al., "A Survey of Convolutional Neural Networks: Analysis, Applications, and Prospects", IEEE Transactions on Neural Networks and Learning Systems, vol. 33, Issue 12, Jun. 10, 2021, pp. 6999-7019.

Li, et al., "Auto-Tables: Relationalize Tables without Using Examples", ACM SIGMOD Record, vol. 53, Issue 1, May 14, 2024, pp. 76-85.

Li, et al., "Auto-Tables: Synthesizing Multi-Step Transformations to Relationalize Tables without Using Examples", arXiv preprint arXiv:2307.14565, Jul. 27, 2023, 15 pages.

Li, et al., "Auto-Tables: Synthesizing Multi-Step Transformations to Relationalize Tables without Using Examples", arXiv:2307.14565v2, Aug. 9, 2023, 15 pages.

Lin, et al., "Auto-BI: Automatically Build BI-Models Leveraging Local Join Prediction and Global Schema Graph", arXiv preprint arXiv:2306.12515, Jun. 21, 2023, 18 pages.

Nobari, et al., "Efficiently Transforming Tables for Joinability", IEEE 38th International Conference on Data Engineering (ICDE), May 9, 2022, 14 pages.

Yang, et al., "Auto-Pipeline: Synthesizing Complex Data Pipelines By-Target Using Reinforcement Learning and Search", arXiv preprint arXiv:2106.13861, Aug. 3, 2021, 16 pages.

Zhu, et al., "Auto-join: joining tables by leveraging transformations", Proceedings of the VLDB Endowment, vol. 10, Issue 10, Jun. 1, 2017, pp. 1034-1045.

\* cited by examiner

NON-CONFORMING DATA TABLE 128(1)

| | A | B | C | D | E | F | G | H | I | J | K | L | M |
|---|---|---|---|---|---|---|---|---|---|---|---|---|---|
| 1 | PRODUCT | PRODUCT CATEGORY | STORE | 19-OCT | 20-OCT | 21-OCT | 22-OCT | 23-OCT | 24-OCT | 25-OCT | 26-OCT | 27-OCT | 28-OCT |
| 2 | HUFFY 18IN BIKE | SPORTS | s_sk_101 | 5 | 3 | 4 | 15 | 19 | 2 | 5 | 11 | 3 | 9 |
| 3 | KENT 18IN BMX BIKE | SPORTS | s_sk_101 | 8 | 5 | 11 | 12 | 8 | 14 | 7 | 5 | 9 | 9 |
| 4 | HP 11IN CHROMEBOOK | ELECTRONICS | s_sk_102 | 17 | 9 | 14 | 5 | 19 | 18 | 17 | 18 | 10 | 7 |
| 5 | MAINSTAYS COMPUTER DESK | FURNITURE | s_sk_103 | 6 | 4 | 11 | 16 | 8 | 7 | 6 | 9 | 8 | 20 |

AUTOMATIC CONVERSION 106(1) → TRANSFORMATIONAL OPERATOR 114(1) (STACK OPERATION)

CONFORMING RELATIONAL DATA TABLE 132(1)

| | A | B | C | D | E |
|---|---|---|---|---|---|
| 1 | PRODUCT | PRODUCT CATEGORY | STORE | DATE | UNIT SOLD |
| 2 | HUFFY 18IN BIKE | SPORTS | s_sk_101 | 19-OCT | 5 |
| 3 | HUFFY 18IN BIKE | SPORTS | s_sk_102 | 20-OCT | 3 |
| 4 | HUFFY 18IN BIKE | SPORTS | s_sk_103 | 21-OCT | 4 |
| 5 | HUFFY 18IN BIKE | SPORTS | s_sk_104 | 22-OCT | 15 |
| 6 | ... | | | | ... |
| 7 | KENT 18IN BMX BIKE | SPORTS | s_sk_101 | 19-OCT | 8 |
| 8 | KENT 18IN BMX BIKE | SPORTS | s_sk_102 | 20-OCT | 5 |

FIG. 2A

NON-CONFORMING DATA TABLE 128(2)

|   | A | B | C | D | E | F | G | H | I | J | K |
|---|---|---|---|---|---|---|---|---|---|---|---|
| 1 | COUNTRY | REGION | 2018 – REVENUE ($K) | 2018 – UNITS SOLD | 2018 – MARGIN% | 2019 – REVENUE ($K) | 2019 – UNITS SOLD | 2019 – MARGIN % | 2020 – REVENUE ($K) | 2020 – UNITS SOLD | 2020 – MARGIN % |
| 2 | ALBANIA | EUROPE | $10 | 224 | 4% | $12 | 269 | 4% | $16 | 350 | 4% |
| 3 | AUSTRALIA | ASIA PACIFIC | $2492 | 54824 | 13% | $2990 | 65789 | 14% | $3888 | 85525 | 16% |
| 4 | ARGENTINA | SOUTH AMERICA | $495 | 10890 | 9% | $594 | 13068 | 11% | $772 | 16988 | 13% |
| 5 | BELARUS | EUROPE | $29 | 638 | 10% | $35 | 766 | 9% | $45 | 995 | 9% |
| 6 | BELGIUM | EUROPE | $384 | 8448 | 15 | $461 | 10138 | 15% | $599 | 13179 | 15% |
| 7 | BRAZIL | SOUTH AMERICA | $102 | 2244 | 12% | $122 | 2693 | 13% | $159 | 3501 | 15% |
| 8 | CANADA | NORTH AMERICA | $4039 | 88858 | 15% | $4847 | 106630 | 17% | $6301 | 138618 | 18% |

→ TRANSFORMATIONAL OPERATOR 114(2) (WIDE-TO-LONG OPERATION) →

AUTOMATIC CONVERSION 106(2)

CONFORMING RELATIONAL DATA TABLE 132(2)

|   | A | B | C | D | E | F |
|---|---|---|---|---|---|---|
|   | COUNTRY | REGION | YEAR | REVENUE ($K) | UNITS SOLD | MARGIN % |
| 2 | ALBANIA | EUROPE | 2018 | $10 | 224 | 4% |
| 3 | ALBANIA | EUROPE | 2019 | $12 | 269 | 4% |
| 4 | ALBANIA | EUROPE | 2020 | $16 | 350 | 4% |
| 5 | AUSTRALIA | ASIA PACIFIC | 2018 | $2492 | 54824 | 13% |
| 6 | AUSTRALIA | ASIA PACIFIC | 2019 | $2990 | 65789 | 14% |
| 7 | AUSTRALIA | ASIA PACIFIC | 2020 | $3888 | 85525 | 16% |
| 8 | ARGENTINA | SOUTH AMERICA | 2018 | $495 | 10890 | 9% |
| 7 | ARGENTINA | SOUTH AMERICA | 2019 | $594 | 13068 | 11% |
| 8 | ARGENTINA | SOUTH AMERICA | 2020 | $772 | 16988 | 13% |

FIG. 2B

NON-CONFORMING DATA TABLE 128(3)

|   | A | B | C | D | E |
|---|---|---|---|---|---|
| 1 |   | HOTEL MISION JURIQUILLA | RAMADA ENCORE HOTEL | FOUR POINTS BY SHERATON | PLAZA CAMELINAS HOTEL |
| 2 | SINGLE ROOM | 1030 | 920 | 1150 | 789 |
| 3 | LODGING TAX | 2.50% | 3.50% | 3.50% | 2.50% |
| 4 | I.V.A. | 0.16 | 0.16 | 0.16 | 0.16 |
| 5 | ADDRESS | CENTRO, CP. 76000 | JURIQUILLA, C.P. 76230 | JURICA, C.P. 76127 | LA CAPILLA, 76170 |
| 6 | PHONE | (442) 234-0000 EX. 547 | (442) 690-9400 | (442) 103-3030 | (442) 192-3900 |
| 7 | WEBPAGE | HTTP://WWW.HTLMISION.COM | WWW.HOTELESENCORE.COM | HTTP://WWW.STARWOOD.COM | WWW.PLAZACAMELINAS.COM |
| 8 | STARS | ***** | **** | ***** | ***** |

AUTOMATIC CONVERSION 106(3) → TRANSFORMATIONAL OPERATOR 114(3) (TRANSPOSE OPERATION)

CONFORMING RELATIONAL DATA TABLE 132(3)

|   | A | B | C | D | E | F | G | H |
|---|---|---|---|---|---|---|---|---|
| 1 |   | SINGLE ROOM | LODGING TAX | I.V.A. | ADDRESS | PHONE | WEBPAGE | STARS |
| 2 | HOTEL MISION JURIQUILLA | 1030 | 2.50% | 0.16 | CENTRO, CP. 76000 | (442) 234-0000 EX. 547 | HTTP://WWW.HTLMISION.COM | ***** |
| 3 | RAMADA ENCORE HOTEL QRO. | 920 | 3.50% | 0.16 | JURIQUILLA. C.P. 76230 | (442) 690-9400 | WWW.HOTELESENCORE.COM | **** |
| 4 | FOUR POINTS BY SHERATON | 1150 | 3.50% | 0.16 | JURICA, C.P. 76127 | (442) 103-3030 | HTTP://WWW.STARWOOD.COM | ***** |
| 5 | PLAZA CAMELINAS HOTEL | 789 | 2.50% | 0.16 | LA CAPILLA, 76170 | (442) 192-3900 | WWW.PLAZACAMELINAS.COM | ***** |

NON-CONFORMING DATA TABLE 128(4)

| | A |
|---|---|
| 1 | FOUND: 21-OCT-19 10:21:14 |
| 2 | TITLE: CANON EF 100MM MACRO USM |
| 3 | PRICE: 6900 KR |
| 4 | LINK: WWW.FINN.NO/BAP/FORSALE/AD.HTML?FINNKODE=161065896 |
| 5 | FOUND: 21-OCT-19 10:21:15 |
| 6 | TITLE: CANON EF 8MM USM MEDIUM |
| 7 | PRICE: 7500 KR |
| 8 | LINK: WWW.FINN.NO/BAP/FORSALE/AD.HTML?FINNKODE=155541389 |
| 4 | FOUND: 21-OCT-19 10:22:46 |
| 5 | TITLE: PANASONIC LUMIX G 25MM |
| 6 | PRICE: 3200 KR |
| 7 | LINK: WWW.FINN.NO/BAP/FORSALE/AD.HTML?FINNKODE=161066674 |

AUTOMATIC CONVERSION 106(4) → TRANSFORMATIONAL OPERATOR 114(4) (PIVOT OPERATION)

CONFORMING RELATIONAL DATA TABLE 132(4)

| | A | B | C | D |
|---|---|---|---|---|
| 1 | FOUND: 21-OCT-19 10:21:14 | TITLE: CANON EF 100MM MACRO USM | PRICE: 6900 KR | LINK: WWW.FINN.NO/BAP/FORSALE/AD.HTML?FINNKODE=161065896 |
| 2 | FOUND: 21-OCT-19 10:21:15 | TITLE: CANON EF 8MM USM MEDIUM | PRICE: 7500 KR | LINK: WWW.FINN.NO/BAP/FORSALE/AD.HTML?FINNKODE=155541389 |
| 3 | FOUND: 21-OCT-19 10:22:46 | TITLE: PANASONIC LUMIX G 25MM | PRICE: 3200 KR | LINK: WWW.FINN.NO/BAP/FORSALE/AD.HTML?FINNKODE=161066674 |
| 4 | FOUND: 21-OCT-19 10:24:50 | TITLE: PANASONIC LUMIX DMC-G7 | PRICE: 6900 KR | LINK: WWW.FINN.NO/BAP/FORSALE/AD.HTML?FINNKODE=161827163 |

NON-CONFORMING DATA TABLE 128(5)

|   | B | C | D | E | F |
|---|---|---|---|---|---|
| 1 | ADAMS ELEMENTARY | AKI KUROSE MIDDLE SCHOOL | ALKI ELEMENTARY | B.F. DAY ELEMENTARY | ... |
| 2 | ES | MS | ES | ES | ... |
| 3 | 553 | 685 | 373 | 282 | ... |
| 4 | 580 | 719 | 377 | 296 | ... |
| 5 | 609 | 754 | 380 | 310 | ... |
| 6 | 638 | 791 | 384 | 326 | ... |
| 7 | 670 | 829 | 388 | 341 | ... |
| 8 | 702 | 870 | 392 | 358 | ... |

TRANSFORMATIONAL OPERATOR 114(3) (PIVOT OPERATION)

NON-CONFORMING DATA TABLE 128(6)

|   | A | B | C | D | E | F | G |
|---|---|---|---|---|---|---|---|
| 1 | SCHOOL NAME | GRADEID | 2015 | 2016 | 2017 | 2019 | 2020 |
| 2 | ADAMS ELEMENTARY | ES | 553 | 580 | 638 | 670 | 702 |
| 3 | AKI KUROSE MIDDLE SCHOOL | MS | 685 | 719 | 754 | 829 | 870 |
| 4 | ALKI ELEMENTARY | ES | 373 | 377 | 380 | 388 | 392 |
| 5 | B.F. DAY ELEMENTARY | ES | 282 | 296 | 310 | 641 | 358 |
| 6 | ... | ... | ... | ... | ... | ... | ... |

TRANSFORMATIONAL OPERATOR 114(1) (STACK OPERATION)

CONFORMING RELATIONAL DATA TABLE 132(5)

|   | A | B | C | D |
|---|---|---|---|---|
| 1 | SCHOOL NAME | GRADEID | YEAR | NUM |
| 2 | ADAMS ELEMENTARY | ES | 2015 | 553 |
| 3 | ADAMS ELEMENTARY | ES | 2016 | 580 |
| 4 | ADAMS ELEMENTARY | ES | 2017 | 609 |
| 5 | ADAMS ELEMENTARY | ES | 2018 | 638 |
| 6 | ADAMS ELEMENTARY | ES | 2019 | 670 |
| 7 | ADAMS ELEMENTARY | ES | 2020 | 702 |
| 8 | AKI KUROSE MIDDLE SCHOOL | MS | 2015 | 685 |
| 9 | AKI KUROSE MIDDLE SCHOOL | MS | 2016 | 719 |
| 10 | ... | ... | ... | ... |

FIG. 3

SYNTHESIZING TRANSFORMATIONS TO RELATIONALIZE DATA TABLES

BACKGROUND

Relational models organize data into relational data tables. Theoretically, once data is entered in the relational data tables, programs allow the data to be easily queried and processed to provide useful information. However, in practice many relational data tables do not conform to the relational models and the usefulness of the data is greatly diminished.

SUMMARY

This patent relates to relational databases and associated relational data tables. In standard or conforming relational data tables each row should correspond to an entity and each column should correspond to an attribute of the entity. However, such a standard cannot be taken for granted when dealing with data tables "in the wild" (e.g., discoverable on the internet and/or as configured by users). Surveys of real spreadsheet-tables and web-tables show that over 30% of such data tables do not conform to the relational standard. In these cases, complex table-restructuring transformations are needed before these data tables can be queried easily using SQL-based tools. Unfortunately, the required transformations are non-trivial to program, which has become a substantial pain point for technical and non-technical users alike.

The present concepts relate to 'Auto-Tables' concepts that can automatically synthesize pipelines with multi-step transformations (in Python or other languages), to transform non-relational data tables into standard relational forms for downstream analytics. Thus, Auto-Tables provides a technical solution that obviates the need for users to manually make transformations or to manually program transformations.

One example Auto-Tables implementation can obtain conforming relational data tables and can generate training data without human labelling by identifying a transformational operator that will transform an individual conforming relational data table to a non-conforming data table and an inverse transformational operator that will transform the non-conforming data table back to the individual conforming relational data table. The example can train a model with the training data. The trained model can synthesize programs to transform other non-conforming data tables to conforming relational data tables.

This Summary is intended to introduce some of the present concepts described in this patent and is not intended to be limiting or all-inclusive of the novel concepts.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 2A-2D and 3 show example Auto-Tables data table transformations that are consistent with some implementations of the present concepts.

DETAILED DESCRIPTION

Overview

This patent relates to relational databases and associated relational data tables. Modern data analytics like structured query language (SQL) and business intelligence (BI) are predicated on a standard or conforming format of relational data tables, where each row corresponds to a distinct "entity", and each column corresponds to an "attribute" for the entity that contains homogeneous data-values. Such data tables are de facto 'standard' or 'conforming' in relational databases, such that database users may take this for granted. In fact, a significant fraction of data tables "in the wild" (e.g., discoverable on the internet) actually fail to conform to such standards (e.g., are non-conforming). These non-conforming data tables are considerably more difficult to query using SQL-based tools than standard or conforming data tables.

Real data tables in the wild, such as spreadsheet-tables or web-tables, can often be "non-relational" and hard to query, unlike expected standard data tables in relational databases. For instance, random sampling of hundreds of user spreadsheets (in Excel), and web data tables, such as from Wikipedia, for example, show around 30-50% of data tables have such issues. The present concepts provide a technical solution for automatically converting non-conforming data tables into conforming relational data tables without human involvement.

Figure 1:
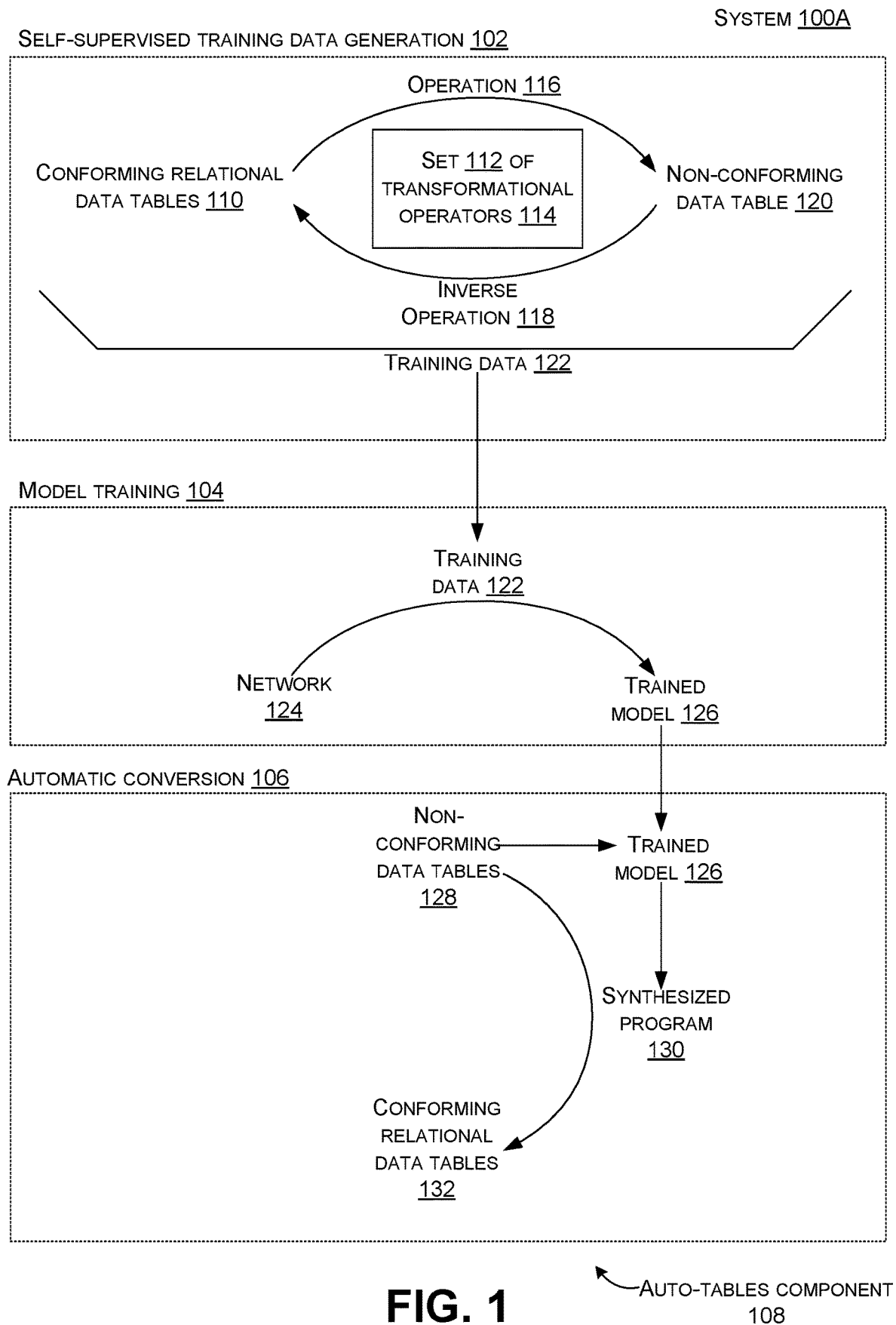
FIGS. 1, 4, and 13 illustrate example systems that can implement Auto-Tables concepts consistent with some implementations of the present concepts.

Introductory FIG. 1 shows an organizational architecture or system 100A. For purposes of explanation, the organizational architecture can be viewed as entailing three main aspects. The first aspect involves self-supervised training data generation 102. The second aspect involves model training 104. The third aspect involves automatically converting user data tables to conforming relational data tables (e.g., automatic conversion) 106. In some implementations, an Auto-Tables component 108 can manage the self-supervised training data generation 102, the model training 104, and/or the automatic conversion 106 of user data tables to conforming relational data tables 110.

Self-supervised training data generation 102 starts with conforming relational data tables 110 and a set 112 of transformational operators (e.g., operators) 114. Example transformational operators 114 are described in more detail below starting in relation to FIGS. 2A-2D and Table 1. Briefly, the self-supervised training data generation leverages a conceptual recognition that operations 116 and inverse operations 118 can be employed to transform conforming relational data tables 110 to non-conforming data tables 120 and back again. This aspect is described in more detail below relative to FIG. 4. Transformational operators 114 that perform the operation 116 and the inverse operation 118 (e.g., pairs of transformational operators 114) can be viewed as training data 122.

Model training 104 can utilize the training data 122 to train a deep learning network or model 124 to produce a trained deep learning model 126. As mentioned above, the model training is achieved without any human labelled training data and instead uses the training data 122 produced via the self-supervised training data generation 102.

Automatic conversion 106 involves supplying non-conforming data tables 128 to the trained model 126. The trained model 126 can synthesize a program 130 to address the supplied non-conforming data tables 128. The synthesized program 130 can convert the non-conforming data tables 128 into conforming relational data tables 132. (Note that identifier 128 is utilized with (user-supplied) 'non-conforming data tables' in relation to the automatic conversion 106 to follow the flow of FIG. 1. However, non-conforming data tables 128 are analogous to (generated) non-conforming data tables 120 described relative to the self-supervised training data generation 102. Similarly, identifier 132 is utilized with (generated) 'conforming relational data tables' in relation to the automatic conversion 106 to follow the flow of FIG. 1. However, conforming relational data tables 132 are analogous to conforming relational data tables 110 described relative to the self-supervised training data generation 102. Thus, conforming relational data tables 110 and 132 can be viewed as equivalent and non-conforming data tables 120 and 128 can be viewed as equivalent).

The present concepts provide a technical solution that allows all of the functionality of FIG. 1 to be achieved without any user involvement. For instance, human involvement is not needed to label training data and human involvement is not needed to manually convert non-conforming data tables to conforming relational data tables or to manually write a program to perform the conversion/transformation. The description now provides examples of conversions from non-conforming data tables 128 to conforming/transforming relational data tables 132.

FIGS. 2A-2D show real examples of non-conforming data tables 128 taken from spreadsheets to demonstrate these common issues. Non-conforming data tables 128 are commonly found at many sites on the internet. In each of FIGS. 2A-2D, non-conforming data tables 128 (e.g., input tables) are not relational and as such are hard to query. The non-conforming data tables 128 need to be transformed to produce corresponding conforming relational data tables 132 (e.g., output tables) that are relational and easy to query. The present concepts can provide a technical solution that automatically and without human effort converts these non-conforming data tables 128 to conforming relational data tables 132. No human involvement means that humans do not have to label training data, humans do not have to manually transform the non-conforming data tables, and humans do not have to write programs to transform the non-conforming data tables. In some implementations, the technical solution can be provided by the Auto-Tables component 108.

FIGS. 2A-2D collectively show example conversions from non-conforming data tables 128 to conforming relational data tables 132. These conversions can be accomplished by the automatic conversion 106. The automatic conversion 106 can employ individual transformational operators 114 from the set 112 of transformational operators as part of synthesized program 130 (shown in FIG. 1). In some implementations, some or all of the content shown in FIGS. 2A-2D may be presented to the user on a user interface (UI) to allow the user to understand what conversions are being performed. In such cases, visual organizational clues can be utilized to aid the reader. The visual organizational clues can entail colors and/or cross-hatching of rows and/or columns that are related. The illustrated configuration employs cross-hatching to indicate related columns and/or rows.

FIG. 2A shows non-conforming data table 128(1) (e.g., input table) that is not a standard relational data table, because each column marked with cross-hatching contains sales numbers for only a single day ("19-Oct.", "20-Oct.", etc.). This aspect makes these column values highly homogeneous in the horizontal direction. In contrast in conforming relational data tables, the values in columns are expected to be homogeneous in the vertical direction. Although this specific data table format of non-conforming data table 128(1) makes it easy for humans to eyeball changes day-over-day by reading horizontally, it is unfortunately hard to analyze using SQL.

For purposes of explanation, assume that a user needs to compute the 14-day average of sales, starting from "20-Oct."—for this non-conforming data table 128(1). To accomplish this the user has to write: SELECT SUM ("20-Oct.", "21-Oct.", "22-Oct.", . . . ) FROM T, across 14 different columns, which is long and unwieldy to write. Now assume that the user needs 14-day moving averages with every day in October as the starting date—the resulting SQL is highly repetitive and hard to manage. In contrast, consider a transformed version of this non-conforming data table 128(1) identified as conforming relational data table 132(1) (e.g., output table). In conforming relational data table 132(1), the homogeneous columns in the original table (marked in cross-hatching) are transformed into only two new columns: "Date" and "Units Sold", using a transformation operation called "stack," which is performed by transformational operator 114(1). This transformed conforming relational data table 132(1) contains the same information as the input table, but is much easier to query. For instance, the same 14-day moving average can be computed using a succinct range-predicate on the "Date" column, where the starting date "20-Oct." is a literal parameter that can be easily changed into other values.

FIG. 2B shows another example non-conforming data table 128(2) where every three columns form a group, representing "Revenue/Units Sold/Margin" for a different year, repeating many times (visually grouped by various cross-hatching patterns). Non-conforming data table 128(2) with these repeating column-groups is also hard to query just like FIG. 2A. In this case the required transformation operator 114(2) performs a "wide-to-long" operation to generate conforming relational data table 132(2).

FIG. 2C shows another example non-conforming data table 128(3) and associated automatic conversion 106(3) to conforming relational data table 132(3). Non-conforming data table 128(3) shows an example where each hotel corresponds to a column (whose names are in row 1), and each "attribute" of these hotels corresponds to a row. Note that in this case values in the same rows are homogeneous (marked in different cross-hatching), unlike relational data tables where values in the same columns are homogeneous. A transformation called "transpose" is employed in this case by transformational operator 114(3) to make the resulting conforming relational data table 132(3). The conforming relational data table 132(3) is easy to query. For instance, a query to sum up the total number of hotel rooms is hard to write on the non-conforming data table 128(3), but can be easily achieved using a simple SUM query on the "Single Room" column in the conforming relational data table 132(3).

FIG. 2D shows another example non-conforming data table 128(4) and associated automatic conversion 106(4) to conforming relational data table 132(4). In this example non-conforming data table 128(4), the columns are represented as rows. This is similar to FIG. 2C, except that the rows in this case are "repeating" in groups, thus requiring a different transformational operator called "pivot" which is performed by transformational operator 114(4). The resulting conforming relational data table 132(4) is easy to query.

Note that in some implementations, the Auto-Tables component 108 may present the content of FIGS. 2A-2D (or a subset thereof) on a user interface (UI) to allow a user to view the conversions. This can allow the user to understand the conversions and/or accept or reject the conversions, depending on the implementation. For instance, Auto-Tables component 108 may generate a UI that allows the user to upload or link their data tables. The Auto-Tables component 108 can cause transformations to be performed on non-conforming data tables and show the transformations to the user in UIs similar to FIGS. 2A-2D. In some implementations, the user can accept or reject the transformations. The user feedback can be used to refine the trained model 126 (FIG. 1) to improve future transformations. While the examples so far are all taken from spreadsheets, similar structural issues are also widespread in web tables. The concepts applied above can be applied in these and other contexts.

FIG. 1 introduces the set 112 of transformational operators 114 that can be employed during the automatic conversion of the non-conforming data tables 128 to conforming relational data tables 132. FIGS. 2A-2D illustrate four example transformational operators 114(1), 114(2), 114(3), and 114(4). Table 1 shows these four transformational operators 114(1)-114(4) as well as four additional example transformational operators 114(5)-114 (8) of the set 112 in a first column. The operator names relate to domain specific language (DSL) names. Table 1 also shows equivalents for the transformational operators in other languages in a second column (e.g., the names for equivalent operators in other languages, such as Python and Pandas). The table shows operator parameters in a third column, and a description in the fourth column.

Table 1 of set 112 of transformational operators 114.

| Operator | Python Pandas equivalent | Operator parameters | Description (example in parenthesis) |
|---|---|---|---|
| stack 114(1) | melt | start_idx, end_idx | collapse homogeneous cols into rows (FIG. 2A) |
| wide-to-long 114(2) | wide_to_long | start_idx, end_idx, delim | collapse repeating col-groups into rows (FIG. 2B) |
| Transpose 114(3) | transpose | — | convert rows to columns and vice versa (FIG. 2C) |
| Pivot 114(4) | pivot | repeat_frequency | pivot repeating row-groups into cols (FIG. 2D) |
| explode 114(5) | explode | column_idx, delim | convert composite cells into atomic values |
| ffill 114(6) | ffill | start_idx, end_idx | fill structurally empty cells in tables |
| subtitles 114(7) | copy, ffill, del | column_idx, row_filter | convert table subtitles into a column |
| none 114(8) | — | — | no-op, the input table is already relational |

Table 1 shows the set 112 of eight transformation operators 114 commonly utilized to relationalize tables. Note that while this set 112 includes eight transformational operators, more or less transformational operators can be employed in a set to accomplish transformations on the encountered data tables. Note that since the Auto-Tables concepts can utilize self-supervision for training that is not tied to the specific choices of operators, the concepts can be easily extended to include additional operators for new functionalities.

The first column of Table 1 shows the name of the "operator," which may be instantiated differently in different languages (e.g., in Python or R), with different names and syntax. The second column of the table shows the equivalent Pandas operator in Python, which is a popular API for manipulating tables among developers and data scientists.

Stack operator 114(1) is a Pandas operator that is also known as melt and unpivot in other contexts. The stack operator collapses contiguous blocks of homogeneous columns into two new columns. As shown in FIG. 2A, column headers of the homogeneous columns ("19-Oct.", "20-Oct.", etc.) are converted into values of a new column called "Date," making it substantially easier to query (e.g., to filter using a range-predicate on the "Date" column).

Properly invoking stack entails providing two important parameters, start_idx and end_idx (listed in the third column of Table 1). These parameters specify the starting and ending column index of the homogeneous column-group that needs to be collapsed. The case shown in FIG. 2A should use start_idx=3 (corresponding to column D) and end_idx=12 (column M).

Note that the present Auto-Tables concepts aim to synthesize complete transformation steps that can execute on non-conforming data tables. The present Auto-Tables concepts can predict not only the operators (e.g., stack for the table in FIG. 2A), but also the exact parameter values correctly (e.g., slightly different parameters such as start_idx=4 and end_idx=12 would fail to produce the desired transformation).

Wide-to-long operator 114(2) collapses repeating column groups into rows. FIG. 2B shows such an example, where "Revenue/Units Sold/Margin" from different years form column-groups that repeat once every three columns. All these repeating column-groups can collapse into three columns, with an additional "Year" column for year info from the original column headers, as shown on the right in FIG. 2B. Observe that wide-to-long is similar in spirit to stack as both collapse homogeneous columns, although stack cannot produce the desired outcome when columns are repeating in groups, as is the case in this example shown in FIG. 2B.

The wide-to-long operator 114(2) has three parameters, where start_idx and end_idx are similar to the ones used in stack. It has an additional parameter called "delim", which is the delimiter used to split the original column headers, to produce new column headers and data-values. For example, in the case of FIG. 2B, "delim" should be specified as "-" to produce: (1) a first part corresponding to values for the new "Year" column ("2018", "2019", etc.); and (2) a second part corresponding to the new column headers in the transformed table ("Revenue", "Units Sold", etc.). Like in stack, all three parameters here need to be instantiated correctly, before synthesizing the desired transformation.

Transpose operation 114(3) is a table-restructuring operator that converts rows to columns and columns to rows, which is also used in other contexts such as in matrix computation. FIG. 2C shows an example non-conforming data table (e.g., input table), for which transpose is needed to produce the conforming relational data table (e.g., output table). The conforming relational data table is relational and easy to query. Invoking transpose operation 114(3) requires no parameters, as all rows and columns will be transposed.

Like transpose, the Pivot operation 114(4) converts rows to columns, as shown in the example in FIG. 2D. In this way, the pivot operation is similar to the transpose operation. However, in this case rows show repeating-groups (whereas in wide-to-long columns show repeating-groups), which need to be transformed into columns, like shown on FIG. 2D.

Pivot operation 114(4) has one parameter, "repeat_frequency", which specifies the frequency at which the rows repeat in the non-conforming data table (e.g., input table). In the case of FIG. 2D, this parameter should be set to four, as the cross-hatching pattern of rows would suggest.

Table 1 has 4 additional table-restructuring operators 114(5-114(8). These include (1): "explode" operator 114(5), which converts columns with composite values (violating the First Normal Form) into atomic values, so that the table can be queried using standard SQL; (2): "ffill" operator 114(6), which fills values in structurally empty cells so that the data table can be queried; (3): "subtitle" operator 114(7), which converts rows representing table sub-titles into separate columns for ease of queries; and finally (4): a "none" operator 114(8) for input tables that are already relational, for which no transformation is needed. This latter operator is needed explicitly so the techniques do not "over-trigger" on data tables that require no transformation.

Explode operator 114(5) is an operator that converts columns with composite values (which violates the First Normal Form of relational data tables), into atomic values. An explode would convert each atomic value into a separate row, making the resulting table more amenable to analysis.

As shown in Table 1, the explode operator 114(5) has 2 parameters, a "column_idx" parameter to specify which column to operate on, and a "delim" parameter that specifies how composite cells can be broken into atomic values.

Ffill 114(6) is an operator that fills values into structurally empty cells in data tables. Unlike empty cells that may occur randomly inside tables, structurally empty cells are often organized hierarchically for visual browsing, which are the key visual signals for the algorithms to detect.

Like operators such as stack, ffill requires two parameters, start_idx and end_idx, in order to identify columns for which ffill needs to be performed.

Subtitle 114(7) is an operator that transforms tables that embed subtitle information, which are mixed together with data-rows, but with visual clues, such as being empty for all cells in the same row, to the right of the sub-title cell.

Subtitle has two parameters, column_idx that identifies the column that contains subtitle information, and row_filter that filters to rows that actually contain subtitles.

None 114(8) is a special no-op operator, to indicate that an input table is already relational, for which no additional transformation is needed. None does not require any parameters.

FIGS. 2A-2D show examples where a non-conforming data table can be transformed to a conforming relational data table with one operation. Some transformations entail multiple operations. FIG. 3 shows an example non-conforming data table 128(5). In this case, synthesized program 130 first causes a transpose operator 114(3) to transform the non-conforming data table 128(5) into an intermediate non-conforming data table 128(6) by swapping rows and columns. Next, synthesized program 130 causes stack operation 114(1) to transform the intermediate non-conforming data table 128(6) into conforming relational data table 132(5) by collapsing homogeneous columns (C to G) into two new columns. Stated another way, a first operator transforms the input table into a second data table. A second operator transforms the second data table into a conforming relational data table. Thus, the first and second operators operate serially, with the second operator operating on the output of the first operator.

While the functionalities listed in Table 1 already exist in languages such as R and Python, they are not easy for users to invoke correctly. For instance, with existing manual techniques, users need to visually identify different structural issues in a non-conforming data table that makes it hard to query (e.g., repeating row/column groups shown in FIG. 2A-2D), which is not obvious to non-expert users. Next users need to map the visual pattern identified from the non-conforming data table (e.g., input table) to a corresponding operator in Table 1 that can handle such issues. This is hard as users are often unfamiliar with the exact terminologies to describe these transformation operators (e.g., pivot vs. stack), often needing to search online for help. Further, users need to parameterize the chosen operator appropriately, using parameters tailored to the non-conforming data table (e.g., which columns need to collapse into rows, what is the repeating frequency of column groups, etc.). Again, this is hard as even developers need to consult the API documentation, which is often long and complex. Further still, certain non-conforming data tables require more than one transformation step, for which users need to repeat step (1)-(3) multiple times.

Completing these manual steps is a tall order even for technical users, as evidenced by a large number of related questions on forums like StackOverflow. If technical users like developers find it hard to restructure their data tables, it comes as no surprise that non-technical enterprise users, who often deal with data tables in spreadsheets, would find the task even more challenging. A large number of similar questions exist on Excel and Tableau forums, where users complain that without the required transformations it is hard to analyze data using SQL-based or Excel-based tools. The prevalence of these questions confirms data table transformations (e.g., restructuring) as a common pain point for both technical and non-technical users. Further, even if a user is proficient, the process is time consuming and slows down overall usefulness of the data in the non-conforming data tables. The present concepts provide a technical solution that performs the transformations very quickly, such as in a matter of seconds, and without human effort.

The present concepts provide a technical solution that synthesizes transformations without examples. This technical solution can automatically synthesize table-restructuring steps to relationalize data tables, using the Domain Specific Language (DSL) of operators, such as those in Table 1, without requiring users to provide examples. One key intuition of why examples are not needed for this restructuring problem lies in the observation that the required transformations to relationalize a data table are almost always unique given the data table, as the examples in FIGS. 2A-2D would all show. This is because the transformations required in this problem only "restructure" data tables, and do not actually "alter" the table content. This stands in contrast to existing techniques that focus on row-to-row transformations, or SQL-by-example, where the output is "altered" and can produce many possible outcomes. These existing techniques would require users to provide input/output examples to demonstrate the desired outcome.

The present transformation solutions do not need to ask users to provide examples. This is a substantial technical advantage because in the context of table-to-table transformations, asking users to provide examples would mean users have to specify an output table, which is a substantial amount of typing effort, making it cumbersome to use.

In the computer vision literature, object detection algorithms are typically trained using large amounts of labeled data (e.g., pictures of dogs that are manually labeled as such). Analogous labeled datasets are not available in the data table realm. The present concepts offer a novel self-training technical solution that exploits the inverse functional relationships between operators (e.g., the inverse of "stack" is known as "unstack"), to automatically build large amounts of training data without requiring humans to label training data. This aspect is described in more detail below relative to FIG. 5.

The present concepts can include a computer-vision inspired model specifically designed for the data table transformation task. The computer-vision inspired model scans through rows and columns to extract salient tabular features, reminiscent of how computer-vision models extract features from image pixels for object detection.

In light of the description above and the table-restructuring operators listed in Table 1, the program synthesis problem can be defined as detailed below.

Definition 1. Given an input table T, and a set of operators O={stack, transpose, pivot, . . . }, where each operator O∈O has a parameter space P(O), the process can synthesize a sequence of multi-step transformations $M=(O_1(p_1), O_2(p_2), \ldots, O_k(p_k))$, with $O_i \in O$ and $p_i \in P(O_i)$ for all $i \in [k]$, such that applying each step $O_i(p_i) \in M$ successively on T produces a relationalized version of T.

Note that Auto-Tables predicts both the operator $O_i$ and its exact parameters $p_i$ correctly, each step along the way. This is challenging as the search space is large—even for a single-step transformation. There are thousands of possible operators/parameters to choose from (e.g., a table with 50 columns that requires a "stack" operation will have 50×50=2500 possible parameters of start_idx and end_idx). For two-step transformations the search space is already in the millions (e.g., for "stack" alone it is $2500^2 \approx 6$ M). Given the large search space, even a small difference in parameters can render the resulting transformation incorrect, as shown below.

Example 1. Given the non-conforming data table 128 (e.g., input table T) shown on FIG. 3 the ground-truth transformation M to relationalize T has two-steps: M=(transpose ( ) stack (start_idx: "2015", end_idx: "2020")). Here the first step "transpose" swaps the rows with columns, and the second step "stack" collapses the homogeneous columns (between column "2015" and "2020"). Note that this is the only correct sequence of steps-reordering the two steps, or using slightly different parameters (e.g., start_idx="2016" instead of start_idx="2015"), will all lead to incorrect output, which makes the problem challenging.

Also note that although synthesized programs are shown using DSL syntax, the resulting programs can be easily translated into different target languages, such as Python Pandas or R, which can then be directly invoked.

The description now turns to an example Auto-Tables system, which learns to synthesize transformations. This explanation starts with an architecture overview before delving into individual components.

Figure 4:
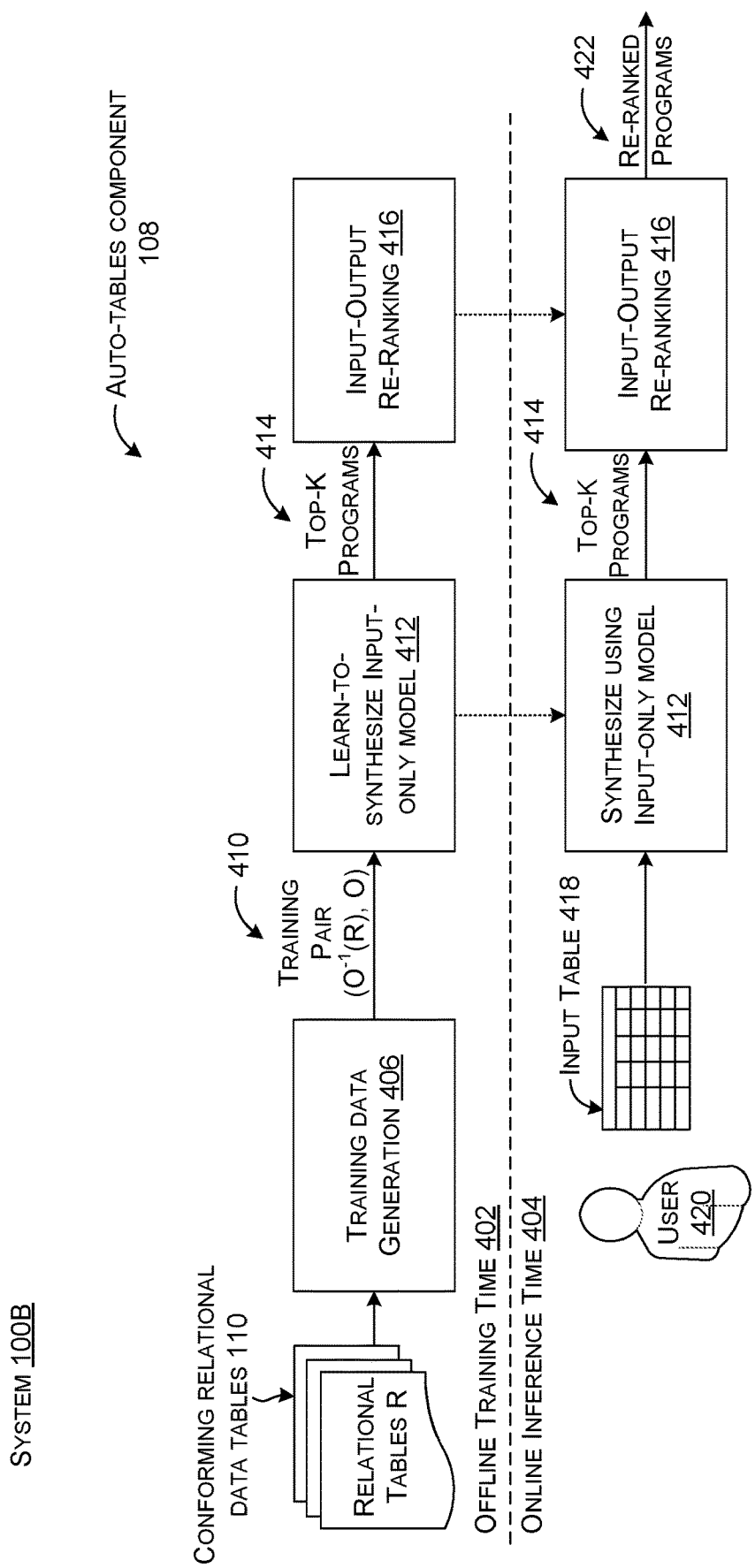

FIG. 4 shows an example Auto-Tables architecture on a system 100B. This system 100B is similar to system 100A of FIG. 1, but offers additional details relative to some aspects. For purposes of explanation, the system 100B is divided into events that occur in offline training time 402 and events that occur in online inference time 404.

At offline training time 402 the Auto-Tables system uses a "training data generation" module 406 that consumes large collections of relational tables R, to produce training pairs 410. An "input-only synthesis" module/model 412 learns-to-synthesize (e.g., is trained) using the training data pairs 410. The input-only synthesis module/model 412 produces top-k programs 414. An "input-output re-ranking" module/model 416 holistically considers both the input table and the output table (produced from the synthesized program), to find the most likely program (e.g, re-ranks the programs generated by the input-only synthesis module 412). For ease of explanation, from one perspective, the input-only synthesis module/model 412 can be viewed as a module that trains a model of the same name. Similarly, the input-output re-ranking module/model 416 can be viewed as a module that trains a model of the same name.

The online inference-time 404 portion closely follows the offline steps, and directly invokes the (now trained) input-only synthesis module/model 412 and the input-output re-ranking module/model 416 that were trained in the offline training time 402. A test input table 418 (e.g., user data tables) can be received from or relate to users 420. For instance, a user interface, such as a dashboard can be generated that facilitates the data table transformation process to conforming relational data tables. The user or other source can paste or otherwise link or identify their test input data table to the dashboard. The input table 418 is passed through the input-only synthesis model 412, to identify top-k candidate programs 414. The top-k candidate programs are then re-ranked by the input-output model 416 for final predictions in the form of re-ranked programs 422.

The description now focuses on these three aspects in turn below beginning with self-supervised training data generation.

As discussed earlier, the examples in FIG. 2A-2D demonstrate that there are clear patterns in the input tables that can be exploited (e.g., repeating column-groups and row-groups) to predict required transformations for a given data table. Note that these patterns are "visual" in nature, which can likely be captured by computer-vision-like algorithms.

As mentioned, there is no existing labeled data that can be leveraged for the present synthesis task. Further, labeling data tables manually from scratch is likely too expensive to scale. To overcome the lack of data, the present concepts include a novel self-supervision framework leveraging the inverse functional-relationships between operators, to automatically generate large amounts of training data 122 without using human generated labels.

Figure 5:
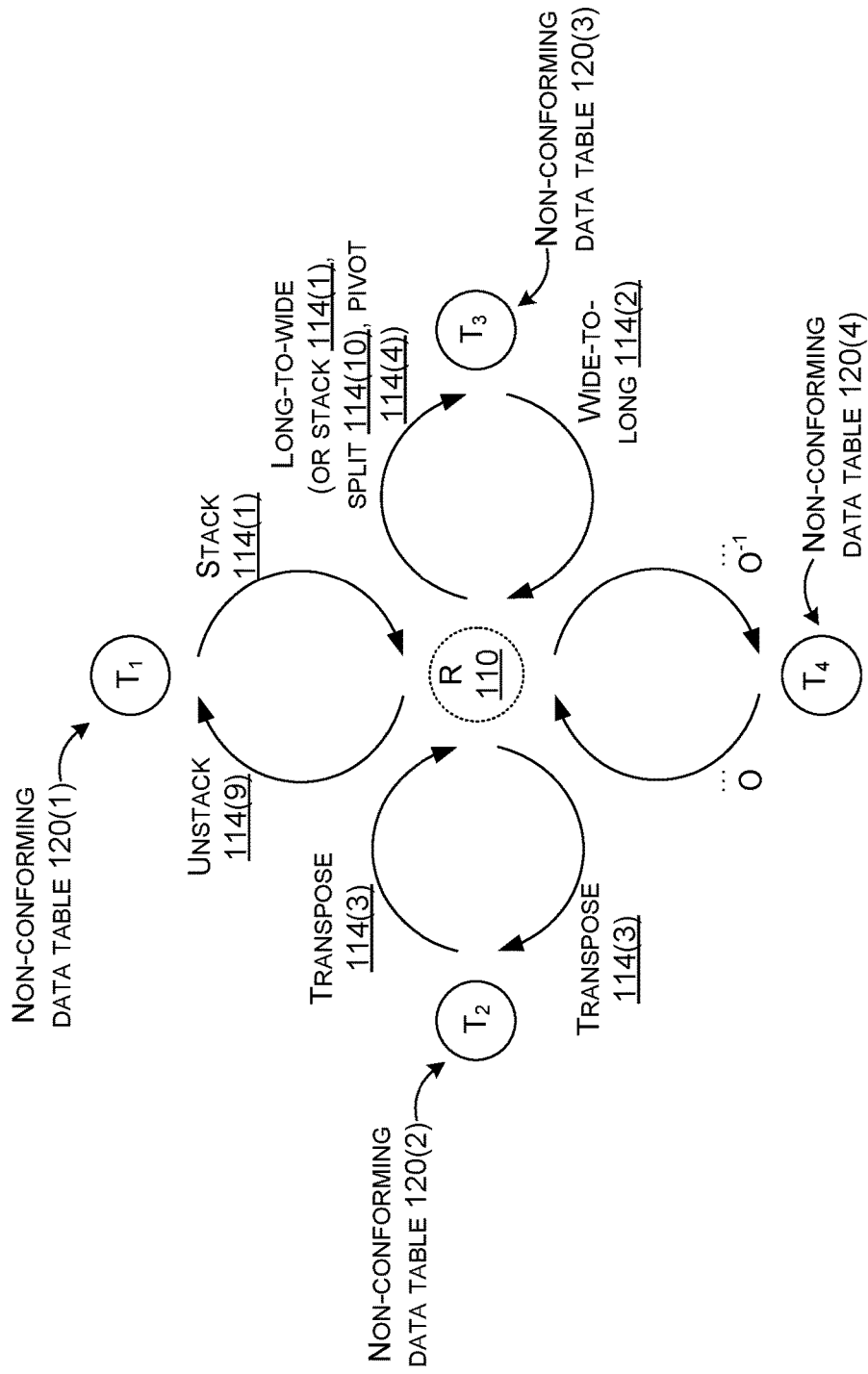
FIG. 5 illustrates an example graphical representation of Auto-Tables transformations that is consistent with some implementations of the present concepts.

FIG. 5 shows a graphical representation 500 of inverse functional relationships of operators 114 between non-conforming data tables 120 and conforming relational data tables 110. The inverse operators can be leveraged to generate training data (122, FIG. 1). In order to learn-to-synthesize operator O, the technique can start from any relational table R, apply its inverse operator $O^{-1}$ to obtain $O^{-1}$ (R). Given $T=O^{-1}$ (R) as an input data table, this means that O must be its ground-truth transformation because $O(O^{-1}(R))=R$. Note that operator O is analogous to operator 114 of FIG. 1, relational table R is analogous to conforming relational data table 110 of FIG. 1, and non-relational table T is analogous to non-conforming data table 120 of FIG. 1.

Briefly, in order to build a training example for operator O (e.g., "stack" 114(1)), the technique starts from a relational table R and applies the inverse of O, denoted by $O^{-1}$ (e.g., "unstack" 114(9)), to generate a table $T=O^{-1}(R)$, which is non-relational. For this task, given T as input, O must be its ground-truth transformation, because by definition O(T)=O(O$^{-1}$(R))=R, which turns T back to its relational form R. This makes (T,O) an (example, label) pair that the technique can automatically generate at scale, and use as training data 122 of FIG. 1.

Thus, for each operator O in the set 112 of transformational operators 114 that the technique wants to learn-to-synthesize, the technique can find its inverse operator (or construct a sequence of steps that are functionally equivalent to its inverse), denoted by O$^{-1}$. For example, in FIG. 5 the inverse of "transpose" 114(3) is "transpose" 114(3), the inverse of "stack" 114(1) is "unstack" 114(9), while the inverse of "wide-to-long" 114(2) can be constructed as a sequence of three steps ("stack" 114(1) followed by "split" 114(10) followed by "pivot") 114(4)).

The significance of the inverse operators is that it allows the technique to automatically generate training examples. Specifically, to build a training example for operator O (e.g., "stack" 114(1)), the technique can sample any relational table R, and apply the inverse of O, or O$^{-1}$ (e.g., "unstack" 114(9)), to generate a non-relational table T=O$^{-1}$(R). For the present task, given T as input, O must be its ground-truth transformation, since by definition O(T)=O(O$^{-1}$(R))=R, and R is known to be relational. This thus allows the technique to generate (T,O) as an (example, label) pair, which can be used for training. Furthermore, the technique can easily produce such training examples at scale, by sampling: (1) different relational tables R; (2) different operators O; and (3) different parameters associated with each O, therefore addressing the lack of training data technical problem described above.

The overall steps of the self-supervised training data generation 102 are shown in Algorithm 1, where Line 2, Line 3, and Line 6 correspond to the sampling of operators (O), tables (R), and parameters (p), respectively, that together create diverse training examples. Note that in Line 3, an additional "data augmentation" step is performed to create even more diversity in training. This aspect is described in more detail below.

Data augmentation is a technique in computer vision and related fields to enhance training data and improve model robustness. For example, in computer vision tasks, it is observed that training using additional data generated from randomly flipped/rotated/cropped images, can lead to improved model performance (because an image that contains an object, say a dog, should still contain the same object after it is flipped/rotated, etc.)

In the same spirit, the present techniques can augment each relational table R by (1) Cropping, or randomly sampling contiguous blocks of rows and columns in R to produce a new table R'; and (2) Shuffling, or randomly reordering the rows/columns in R to create a new R'. For instance, some implementations can start from over 15K relational tables crawled from public sources and create around 20 augmented tables for each relational table R. This further improves the diversity of the training data and end-to-end model performance.

ALGORITHM 1

| Auto-Gen Training Examples. |
|---|
| input: DSL operators O, large collections of relational tables R |
| output: Training table-label pairs: (T, O$_p$) |
| 1    E ← { } |
| 2    foreach O in O do |

ALGORITHM 1-continued

| Auto-Gen Training Examples. |
|---|
| 3    foreach R in R do |
| 4        foreach R' in Augment(R)// Crop rows and columns |
| 5        do |
| 6            p ← sample valid parameter from space P(O) |
| 7            O$_{p'}^{-1}$ ← construct the inverse of O$_p$ |
| 8            T ← O$_{p'}^{-1}$(R') |
| 9            E ← E ∪ {(T, O$_p$)} |
| 10    return all training examples E |

After obtaining large amounts of training data 122 in the form of (T, O$_p$) using self-supervision, the techniques can employ an "input-only" model that takes T as input, to predict a suitable transformation O$_p$.

Figure 6:
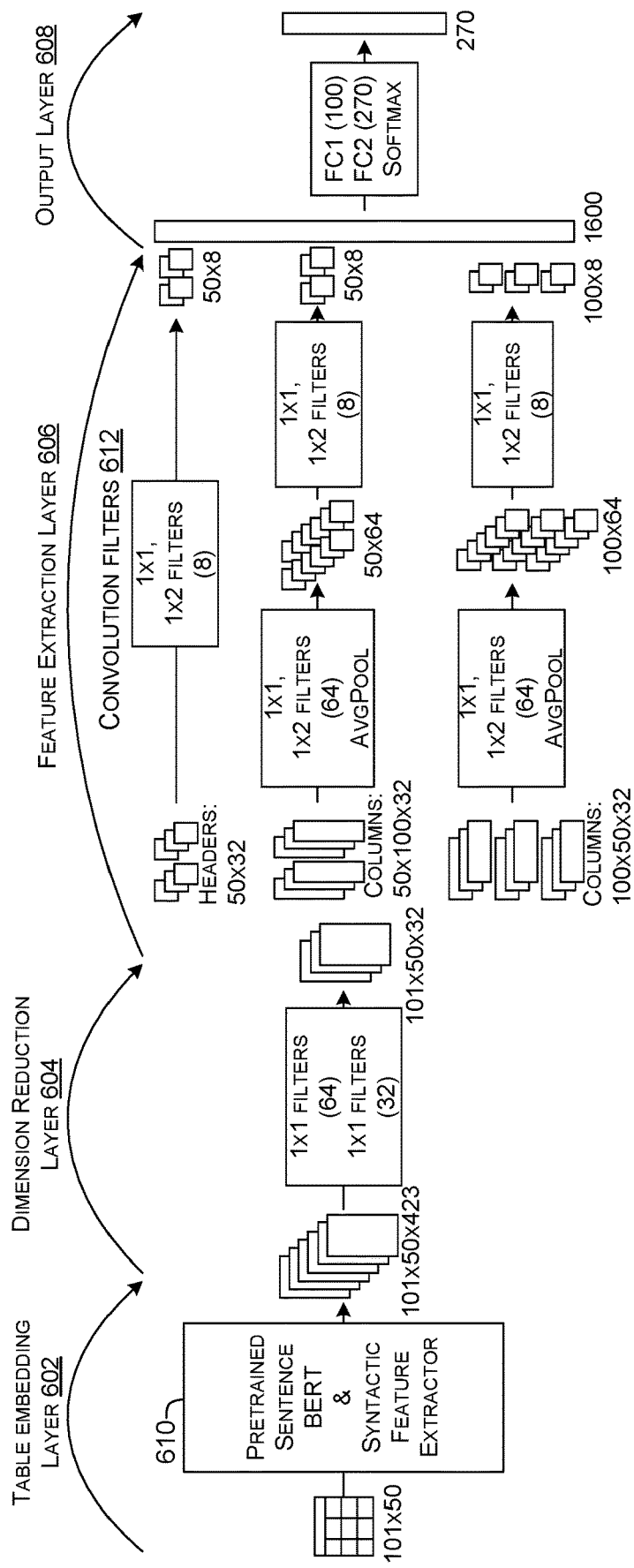
FIGS. 6 and 8 show example Auto-Tables architectures that are consistent with some implementations of the present concepts.

FIG. 6 shows a model architecture 600 for input-only synthesis. The model architecture 600 consists of four sets of layers: (1) table embedding layer 602, (2) dimension reduction layer 604, (3) feature extraction layer 606, and (4) output layer 608.

Given an input table T, the table embedding layer 602 encodes each cell in T into a vector, to obtain an initial representation of T for training. At a high level, at 610, for each cell the technique captures both (1) the "semantic features" (e.g., people-names vs. company-names), and (2) the "syntactic feature" (e.g., data-type, string-length, punctuation, etc.). Both the semantic and syntactic features provide valuable signals in this task, e.g., in determining whether rows/columns are homogeneous or similar.

In this case, pre-trained Sentence-BERT (a state-of-the-art embedding in NLP) is utilized for semantic features. In the table embedding layers 602, BERT maps each cell into a 384-dimension vector that encodes its semantic meaning. For syntactic features, each cell is encoded using 39 pre-defined syntactic attributes (data types, string lengths, punctuation, etc.). Concatenating the syntactic and semantic features produces a 423-dimension vector for each cell. For an input table T with n rows and m columns, this produces a n×m×423 tensor as its initial representation. This aspect will be described in more detail below relative to FIG. 7.

The discussion now turns to the dimension reduction layers 604. The initial representation from the pre-trained Sentence-BERT of the table embedding layer 602 has a large number of dimensions (with information that may be superfluous to this task, which can slow down training and increase the risk of over-fitting). The dimension reduction layer 604 address this superfluous information using two convolution layers with 1×1 kernels, to reduce the dimensionality from 423 to 64 and then to 32, to produce n×m×32 tensors. Note that 1×1 kernels are explicitly used so that the trained weights are shared across all table-cells, to produce consistent representations after dimension reduction.

The feature extraction layers 606 are reminiscent of convolutional neural network (CNN) layers but are specifically designed for the data table task. Recall from FIGS. 2A-2D that the key signals for this task are: (1) identify whether values in row or column-directions are "similar" enough to be "homogeneous" (e.g., FIG. 2B vs. FIG. 2C); and (2) identify whether entire rows or columns are "similar" enough to show repeating patterns (e.g., FIG. 2B vs. FIG. 2D).

Intuitively, heuristics can be produced, then signal (1) above can be extracted by comparing the representations of adjacent cells in row- and column-directions. On the other hand, signal (2) can be extracted by computing the average representations of each row and column, which can then be used to find repeating patterns.

Based on this exercise, and given the strong parallel between the row/columns in data tables and pixels in images, the present implementations can employ feature-extraction layers inspired by convolution filters that are popular in CNN architectures to extract visual features from images. Specifically, as shown in FIG. 6, the feature extraction layer 606 uses 1×2 and 1×1 convolution filters followed by average-pooling, in both row- and column-directions, to represent rows/columns/header. Unlike general n×m filters used for image tasks (e.g., 3×3 and 5×5 filters in VGG and ResNet), the presently employed filters are tailored to the Auto-Tables task. For instance, 1×2 filters can easily learn-to-compute signal (1) above (e.g., 1×2 filters with +1/−1 weights can identify the representation differences between neighboring cells, which when averaged, can identify homogeneity in row/column directions). Also, 1×1 filters can easily learn-to-compute signal (2) above (e.g., 1×1 filters with +1 weights followed by average-pooling, correspond to representations for entire rows/columns, which can be used to find repeating patterns in subsequent layers).

Figure 7A:
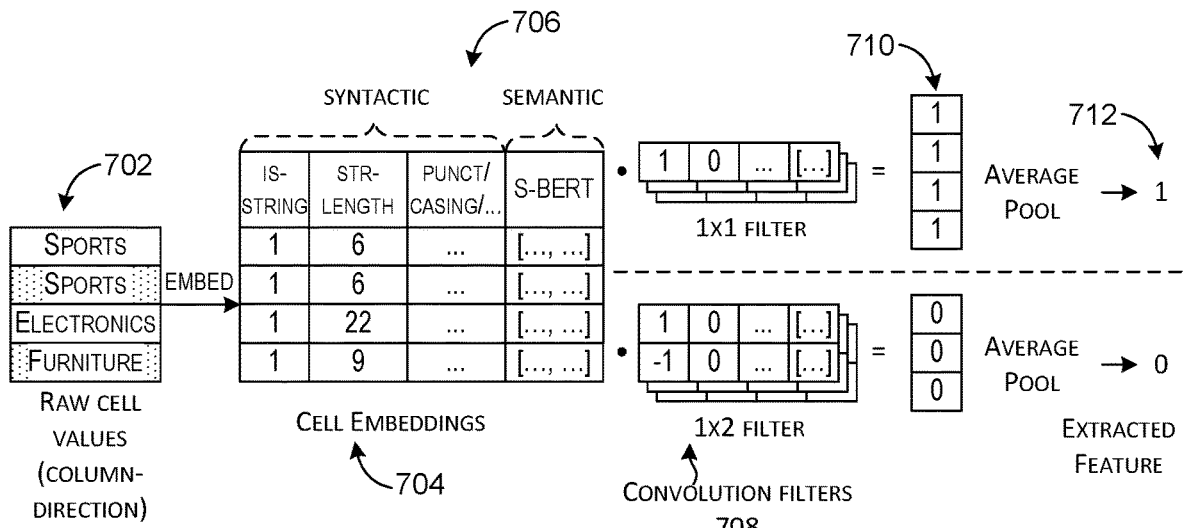
FIGS. 7A and 7B show example Auto-Tables model configurations that are consistent with some implementations of the present concepts.
Figure 7B:
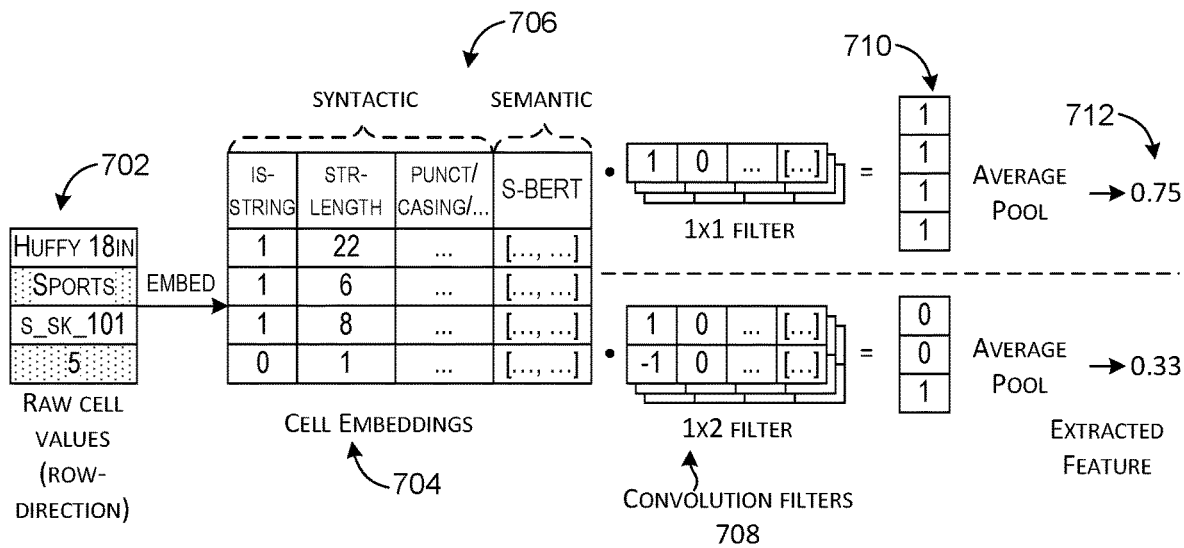

FIGS. 7A and 7B collectively show example model configurations 700 to demonstrate why these 1×1 and 1×2 filters are effective for extracting tabular features. FIG. 7A shows a simplified example, when using Column-B of FIG. 2A as input at 702, which has a list of values "Sports", "Electronics", etc. These raw cell values first pass through the embedding step shown at 704, which is discussed relative to FIG. 8. The embedding step 704 produces a row of features for each value, with both syntactic features (under the headers "is-string", "str-length", etc.), and semantic features (under the header "s-BERT" for sentence-BERT). This results in an embedding table 706, where each row corresponds to an input cell.

Next, this embedding table 706 is passed through 1×1 and 1×2 convolution filters 708, which perform element-wise dot-product operations. Assume the use of a simple '1×1 filter' shown at the top of the FIG. 7A, with weights [1,0, . . . ]. Because only the first bit of this simple filter is 1 and the rest is 0, performing a dot-product on the embedding table 706 essentially only extracts the "is-string" type information of each cell, which in this case is all 1, leading to a matrix of [1,1,1,1] (since all cells are of type string) at 710. After average pooling, this results in a single feature-value 1 to represent a specific aspect of this entire column (in this case, type information) as indicated at 712.

Note that this is just one example 1×1 filter—there exists many such 1×1 filters (shown as stacked in FIG. 7A relative to convolutional filters 708), all of which have learned weights that extract different aspects of syntactic/semantic information from input cells (string-length, semantic-meaning, etc.). This forms a holistic representation of values in the column, to facilitate downstream comparison of "similar" columns (e.g., to identify repeating rows/columns), as mentioned above as signal (2) for the auto-table task.

Also shown on FIG. 7A relative to convolutional filter 708, 1×2 filters, on the other hand, work to "compare" adjacent values in the same column, which intuitively tests for homogeneity. For instance, assume there is a simple 1×2 filter with only +1 and −1 weights in the first column, as shown in FIG. 7A of the convolutional filters 708. Performing a dot-product in this case "compares" the "is-string" type information for neighboring cells, using a sliding window for rows from the top to bottom, which results in [0,0,0] at 710. This result is achieved because the convolution computes 1*1+1*(−1)=0. This is again averaged to produce a feature-value 0 at 712, indicating no type difference, and thus good homogeneity, in the list of given values in the column-direction.

This is again only one example 1×2 filter—there are many other 1×2 filters with different learned-weights (stacked in convolutional filters 708 of FIG. 7A) that use different syntactic/semantic features to test for homogeneity between neighboring cells, which corresponds to the signal (1) to extract as mentioned earlier.

Recall that the CNN-inspired architecture uses convolution filters to scan line-by-line, in both row and column directions. So in the row-direction these filters work in a similar manner.

FIG. 7B shows the same operations in the row-direction. which uses Row-2 of the table in FIG. 2A as an example. In this case at 702 a list of heterogeneous cell values includes "Huffy 18 in.," "Sports," "s_sk_101," "5," etc. In this case, performing a dot-product using the same 1×2 filter in the convolutional filters 708 produces a feature-vector of [0,0,1] (note that the last entry is 1 because the "is-string" value for the last two input cells are 1 and 0, leading to a convolution of 1*1+(−1)*0=1). Average-pooling would then produce 0.33 here, indicating inconsistent types for the list of values in the row-direction (0 would indicate homogeneity, with +1/−1 filter-weights). Other 1×2 filters would work in similar manners, to identify more signals of heterogeneity in the row-direction, all of which are important ingredients to identify latent patterns in the table and corresponding transformations.

These first-levels of features-values from row/column-directions will then go through a second-level of 1×1 and 1×2 convolution filters, to compare and identify similar rows/columns (based on row/column representation from 1×1 filters), to ultimately reveal repeating rows and columns like the color/cross-hatched-coded patterns shown in FIGS. 2A-2D. These tabular features will pass down to the next output layers, for final classifications.

The description now returns to FIG. 6 which shows filters relating to classification. As shown in FIG. 6, output layer(s) 608 use two fully connected layers followed by softmax classification. This produces an output vector that encodes both the predicted operator-type, and its parameters. For example, since one technique considers eight possible operator types as shown in Table 1, the technique can encode this as an eight-dimension one-hot vector. Similarly, as shown in regard to the output layer 608 parameters of each operator can be represented as additional bits in the same output vector, resulting in an output vector of 270 dimensions shown on the extreme right of FIG. 6, which in effect makes multiple predictions (operator-type and parameters) simultaneously, for a given T. Standard softmax functions can be applied on each prediction vector, so that the output of each prediction is normalized into a probability distribution.

The description now returns to FIG. 4 and is directed toward training the model and then synthesizing transformation at inference.

Offline training time 402 can involve a loss function. Given a training input table T, its ground truth operator O and corresponding parameters P=($p_1$, $p_2$, . . . ), let Ô and P̂=($\hat{p}_1$,$\hat{p}_2$, . . . ) be the model predicted probability distributions of O and P respectively. The training loss on T can be computed as the sum of loss on all predictions (both the operator-type, and parameters relevant to this operator):

$$\text{Loss}(T) = L(O, \hat{O}) + \sum_{p_i \in P, \hat{p}_i \in \hat{P}} L(p_i, \hat{p}_i) \quad (1)$$

Here L(y, ŷ) denotes the cross-entropy loss commonly used in classification-let y be an n-dimensional ground truth one-hot vector, and ŷ a model predicted vector, L(y, ŷ) is defined as:

$$L(y, \hat{y}) = -\sum_{i=1}^{n} y_i \log(\hat{y}_i) \quad (2)$$

Given large amounts of training data T (generated from the self-supervision training data generation described above), the Auto-Tables model can be trained by minimizing the overall training loss $\Sigma_{T \in \mathcal{T}} \text{Loss}(T)$ using gradient descent until convergence. This trained model can be referred to as H.

Inference time 404 can involve synthesizing transformations. At inference time, given an input T, the model H produces a probability for any candidate step $O_P$ that is instantiated with operator O and parameters P=($p_1$, $p_2$, ... ), denoted by $Pr(O_P|T)$, as:

$$Pr(O_P|T) = Pr(O) \cdot \prod_{p_i \in P} Pr(p_i) \quad (3)$$

Using the predicted probabilities, finding the most likely transformation step $O_P^*$ given T is then simply:

$$O_P^* = \text{argmax}_{O,P} Pr(O_P|T) \quad (4)$$

This gives the most likely one-step transformation given T. As shown in FIG. 3, certain data tables may require multiple transformation steps for this task.

To synthesize multi-step transformations, predictions can be invoked step-by-step until no suitable transformation can be found. Specifically, given an input table T, at step (1) the most likely transformation $O_P^1$ for T can be found using Equation (4), such that the process can apply $O_P^1$ on T to produce an output table $O_P^1(T)$. The process can be iterated, and at step (2) $O_P^1(T)$ can be fed as the new input table into the model, to predict the most likely $O_P^2(T)$, and produce an output table $O_P^2(O_P^1(T))$. This iterates until at the k-th step, a "none" transformation is predicted (recall that "none" is a no-op operator in the DSL in Table 1, to indicate that the input table is already relational and requires no transformations). The resulting M=($O_P^1$, $O_P^2$, ... ) then becomes the multi-step transformations synthesized for the original T.

The procedure above is an intuitive sketch of multi-step synthesis, though it considers only the top-1 choice at each step. In general, the top-k choices are considered at each step, to find the most likely multi-step transformations overall. The general search procedure of the most likely top-k steps can be performed using beam search, as outlined in Algorithm 2.

Algorithm 2 starts with an empty pipeline M and the original input table T. Each iteration invokes model H on top-k output tables from the last iteration, to obtain the top k candidate operators for each (Line 6). The predicted transformations are performed and expand each M with one additional predicted step to get $M_{next}$ (Line 8), whose probability can be computed as the product of the probability of its operators (Line 9). If a predicted operator is "none," a terminal state is reached and saved as a candidate pipeline (Line 10-11). Otherwise, the current pipeline is kept in the beam for further search (Line 13). At the end of each iteration, all partial pipelines are ranked by probabilities, and only the top k pipelines with the highest probability are kept (Line 14). The search is terminated after a total of L steps (Line 3), and returns the top-k candidate operators with the highest probabilities as output (Line 15-16).

ALGORITHM 2

Multi-step Pipeline Synthesis by top-k Search input: Auto-Tables model H, input table T
output: Top-k predicted pipelines by probabilities: $M_1$, $M_2$ ... $M_k$
  Cands = [ ], M ← [ ], M.prob = 1 initialize
  $B_{cur}$ ← [(T, M)]
  for i = 1, 2, ... L do
    $B_{next}$ ← [ ]
    foreach (T, M) in $B_{cur}$ do
      $\hat{O}_{p1}, \hat{O}_{p2},..\hat{O}_{pk}$ ← H(T) top k predictions
      for j = 1, 2, ...k do
        $T_{next}$ ← $\hat{O}_{pj}(T)$, $M_{next}$ ← M.append($\hat{O}_{pj}$)
        $M_{next}$.prob ← M.prob × $\hat{O}_{pj}$.prob
        if $\hat{O}_{pj}$ = none then
          Cands.append($M_{next}$)
        then
          $B_{next}$.append(($T_{next}$, $M_{next}$))
    sort $B_{next}$ by M.prob, $B_{cur}$ ← $B_{next}$[: k]
  Sort Cands by M.prob
  return Cands[: k]

Algorithm 2 is demonstrated using the following example.

Example 2. Given the input table T shown on FIG. 3, trained model H is invoked to predict likely transformations, where the top-2 is: (1) $O_1$: "transpose" with probability 0.5, which leads to an output table $O_1(T)$ (shown in the middle of FIG. 3), (2) $O_2$: "stack" (with parameters: start-idx=Col-B, end-idx=Col-E) which also has a probability 0.5, that will lead to an output table $O_2(T)$. Both 1-step candidates {$O_1$, $O_2$}, are kept and search of possible second steps continues.

For the second step, if the technique follows the path of $O_1$ it will operate on $O_1(T)$ as the new input table, for which the top-2 predicted steps are: (1) $O_3$ "stack" (start-idx=Col-C, end-idx=Col-E), with probability 0.8, and (2) $O_4$ "none" with probability 0.1. Alternatively, if the technique follows the path of $O_2$ it would have 02 (T) as the new input, for which it also generates its top-2. This leads to a total of 2×2=4 possible 2-step transformations, from which the technique picks the top-2 with the highest probabilities, to continue the search with 3-steps, etc.

All resulting multi-step transformations are ranked by probabilities. This returns {$O_1$, $O_3$} as the most likely (with probability 0.5*0.8=0.4), which is indeed the desired transformation as discussed in Example 2.

The description above relates to "input-only" aspects of the synthesis model as it only uses the characteristics of the input table T to predict transformations M. However, sometimes this is not enough, as the characteristics of the output table, M(T) would also provide useful signals. The following example illustrates this aspect.

In reference to FIG. 3 based only on the input T the model predicts both $O_1$ "transpose" and $O_2$ "stack" as possible choices (both with probability=0.5). "Stack" was incorrectly ranked high, because from T alone "stack" looks plausible, as T has a large number of homogeneous columns (Col-B to E), which fits the typical pattern for "stack" as shown in FIG. 2A.

The technique can better predict whether $O_1$ or $O_2$ is more suitable, by applying both programs on T and inspecting the resulting output $O_1(T)$ and $O_2(T)$. It can be verified that for $O_1(T)$ values in the same columns are homogeneous, whereas $O_2(T)$ (using "stack") leads to a table where values such as "ES", "MS" (from "GroupID") become intermixed with integers in the same columns, which is not homogeneous and not ideal, and is something that the tabular model can detect and penalize. Inspecting the output $O_1(T)$ and $O_2(T)$ thus allows the technique to correctly re-rank $O_1$ as a more likely transformation than $O_2$, which is difficult when a model looks at T alone.

Figure 8:
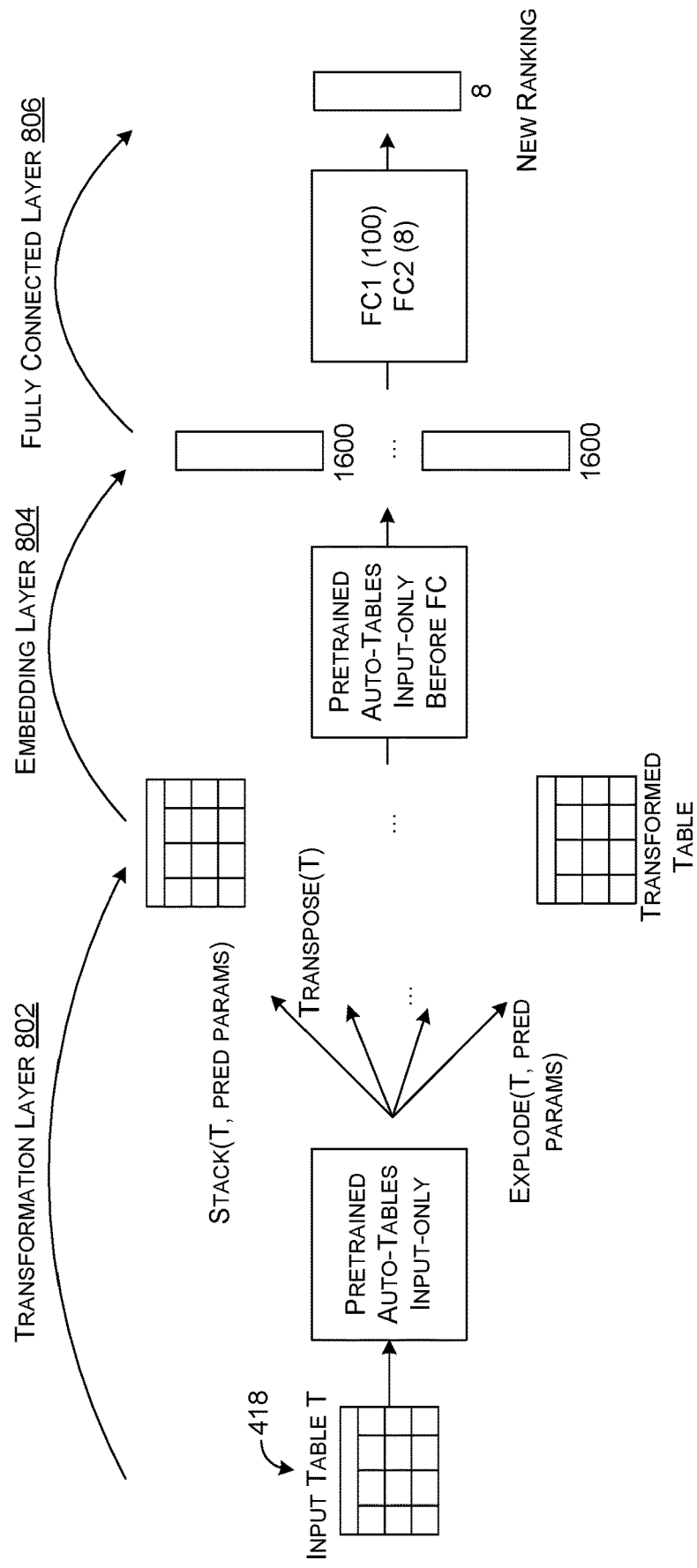

This motivates development of an "input/output-based" re-ranking model architecture introduced relative to FIG. 4. FIG. 8 expands on this aspect and shows an example input/output-based re-ranking model architecture 800 that includes a transformation layer 802, embedding layer 804, and fully connected layer 806. After the input-only synthesis model (412, FIG. 4) described above produces top-k likely operators $\{O_{pi}, i \in [k]\}$ (e.g., the technique considers top-8 operators for re-ranking in these experiments), the re-ranking model will look at all output transformed tables $\{O_{pi}(T), i \in [k]\}$ and aims to generate a re-ranking score for each of them indicating which operator is more suitable based on the output transformed tables. To do so, similar to the input-only model, the technique first converts each transformed data table into a feature vector using table embedding layer 602, dimension reduction layer 604, and feature extraction layer 606 as shown in FIG. 6. Since the input-only model has been trained well at this time, the technique directly reuses the architecture and weights of these layers from the pre-trained input-model.

The technique then concatenates the feature vectors of all transformed tables and uses fully connected layers followed by a softmax function to produce a k-dimension vector as re-ranking scores. For training, the technique considers the re-ranking as a classification task to predict which of the k transformed tables is the ground truth. Thus, the training loss can be computed using cross-entropy loss. The technique can train the re-ranking model using the same training data generated from the self-supervision description above.

Experiments

Extensive evaluations on the performance of different algorithms, using real test data are described below. The results show that the present methods significantly outperform the baseline methods in terms of both quality and efficiency.

An experimental setup and benchmarks for studying the performance of the methods in real-world scenarios entails ATBench benchmark using real cases from three sources: (1) online user forums, (2) Jupyter notebooks, and (3) real spreadsheet-tables and web-tables.

Both technical and non-technical users ask questions on forums, regarding how to restructure their data tables. Users often provide sample input/output tables to demonstrate their needs. 23 such questions from StackOverflow and Excel user forums were sampled as test cases. The user-provided input tables were supplied to Auto-Tables to evaluate whether the correct transformation can be synthesized to produce the desired output table given by users.

Data scientists frequently restructure data tables using Python Pandas, often inside Jupyter Notebooks. 79 table-restructuring steps extracted from the Jupyter Notebooks were sampled as test cases. The transformations programmed by data scientists were used as the ground truth.

A large fraction of tables "in the wild," such as from spreadsheet applications, such as Excel and/or the Web, require transformations before they are fit for querying, as shown in FIGS. 2A-2D and 3. 92 real web-tables and spreadsheet-tables (crawled from a search engine) were sampled that required such transformations. The desired transformations were manually written to provide the ground truth.

As shown in Table 2, combining these sources, provides a total of 194 test cases at the ATBench (of which 26 cases require multi-step transformations). Each test case consists of an input table T, a ground-truth transformation $M_g$, and an output table $M_g(T)$ that is relational.

TABLE 2

Details of ATBench Benchmark

|  | Forum | Notebook | Excel + Web | Total |
| --- | --- | --- | --- | --- |
| Single-Step | 23 | 75 | 70 | 171 |
| transpose | 0 | 11 | 11 | 22 |
| stack | 10 | 20 | 5 | 35 |
| wtl | 6 | 24 | 1 | 31 |
| explode | 2 | 17 | 14 | 33 |
| ffill | 0 | 0 | 13 | 13 |
| pivot | 5 | 3 | 0 | 8 |
| subtitle | 0 | 0 | 26 | 26 |
| Multi-Step | 0 | 4 | 22 | 26 |
| Total | 23 | 79 | 92 | 194 |

The quality and efficiency of different algorithms in synthesizing transformations is evaluated below.

In relation to quality, given an input table T, an algorithm A may generate top-k transformations $(\hat{M}_1, \hat{M}_2, \ldots \hat{M}_k)$, ranked by probabilities, for users to inspect and pick. The success rate of synthesis using the standard Hit@k metric can be evaluated, defined as:

$$\text{Hit@}k(T) = \sum_{i=1}^{k} 1(\hat{M}_i(T) = M_g(T))$$

which looks for exact matches between the top-k ranked predictions ($\hat{M}_i(T), 1 \leq i \leq k$) and the ground-truth $M_g(T)$. The overall Hit@k on the entire benchmark, is then simply the average across all test cases T. This description reports Hit@k up to k=3.

The latency of synthesis using wall-clock time can be representative of efficiency. All experiments are conducted on a Linux VM with 24 vCPU cores, and 4 Tesla P100 GPUs.

The description now turns to the compared methods. The present Auto-Tables method is the only method that does not require users to provide input/output examples (unlike other existing methods). In order to train Auto-Tables, 1.4 M (input-table, transformation) pairs were generated evenly distributed across 8 operators, following the self-supervision procedure described above. This was accomplished using 15K base relational data tables crawled from public sources. A fixed size of input was taken with the first 100 rows and 50 columns at the top-left corner of each data table and used zero-padding for tables with less rows or columns. The method was implemented using PyTorch, trained using Adam optimizer, with a learning rate of 0.001 for 50 epochs, using a batch size of 256.

Foofah (FF) synthesizes transformations based on input/output examples. 100 cells from the top-right of the ground-truth output table were used for Foofah to synthesize programs, which simulate the scenario where a user types in 100 output cells (a generous setting as it is unlikely that users are willing to provide so many examples in practice).

Foofah was tested using the original implementation and was timed-out in each case after 30 minutes.

FlashRelate (FR) is another approach to synthesize transformations based on input/output examples. The testing provided it with 100 example output cells from the ground-truth. It was used as an academic re-implementation of FlashRelate for comparison. A similar time-out of 30 minutes was used for each case.

SQLSynthesizer (SQ) is a SQL-by-example algorithm that synthesizes SQL queries based on input/output examples. SQLSynthesizer was provided with 100 example output cells, and also set a time-out of 30 minutes.

Scythe (SC) is another SQL-by-example method. Scythe was provided with 100 example output cells, like previous methods.

TaBERT is a table representation approach developed in the NLP literature, and pre-trained using table-content and captions for NL-to-SQL tasks. To test the effectiveness of TaBERT in the transformation task, the table representation in Auto-Tables (i.e., output of the feature extraction layer in FIG. 5) was replaced with TaBERT's representation, and trained the following fully connected layers using the same training data.

TURL is another table representation approach for data integration tasks. Similar to TaBERT, the effectiveness of TURL was tested by replacing Auto-Tables representation with TURL's.

GPT-3.5 Type-Only (T-O). GPT is a family of large language models pre-trained on text and code, which can follow instructions to perform a variety of tasks. While GPT is not expected to perform well on Auto-Tables tasks (which are tabular in nature), the comparison was performed nevertheless to establish a baseline. Specifically, the testing used few-shots in-context learning by prompting GPT-3.5 with pairs of input-table/target-operator (e.g., FIGS. 2A-2D). The task was simplified for GPT significantly, by asking it to only predict "operator types" (listed in Table 1), without requiring it to predict parameters.

Table 3 shows experimental results and quality comparison between Auto-Tables and the baselines, evaluated on the benchmark with the 194 test cases shown in Table 2. All methods are grouped into two classes: (1) "No-example methods" that do not require users to provide any input/output examples, which include Auto-Tables, and variants of Auto-Tables that use TaBERT and TURL for table representations, respectively; and (2) "By-example methods" that include Foofah (FF), FlashRelate (FR), SQLSynthesizer (SQ), and Scythe (SC), all of which are provided with 100 ground truth example cells.

TABLE 3

Quality comparison using Hit@k, on 194 test cases.

| | No-example methods | | | | By-example methods | | | |
|---|---|---|---|---|---|---|---|---|
| | Auto- | | | GPT-3.5 | | | | |
| Method | Tables | TaBERT | TURL | (T-O) | FF | FR | SQ | SC |
| Hit@1 | 0.562 | 0.187 | 0.027 | 0.216 | 0.285 | 0.351 | 0 | 0 |
| Hit@2 | 0.68 | 0.43 | 0.075 | — | — | — | 0 | 0 |
| Hit@3 | 0.722 | 0.539 | 0.124 | — | — | — | 0 | 0 |
| Upper-bound | — | — | — | — | 0.421 | 0.538 | 0.34 | 0.34 |

As shown in Table 3, Auto-Tables significantly outperforms all other methods, successfully transforming 72% of test cases in its top-3, without needing users to provide any examples. This is despite the task being very challenging—even for a single-step transformation, there are thousands of possible operators+parameters to choose from (e.g., a table with 50 columns that requires "stack" will have 50×50=2, 500 possible parameters of start_idx and end_idx) and for two-step transformations, the search space is in the millions (e.g., for "stack" alone it is $2500^2$~6 M), which makes this clearly non-trivial.

As shown in Table 3, compared to other no-example methods, Auto-Tables outperforms TaBERT and TURL respectively by 37 and 53 percentage point on Hit@1, and 18 and 59 percentage point on Hit@3. This shows the strong benefits for using the proposed table representation and model architecture, which are specifically designed for the table transformation task.

Table 3 shows that compared to by-example methods, the improvement of Auto-Tables is similarly strong. Considering the fact that these baselines use 100 output example cells (which users need to manually type), whereas the present methods use zero examples, Auto-Tables is clearly a better fit for the table-restructuring task at hand. Since some of these methods (Foofah (FF) and FlashRelate (FR)) only return top-1 programs, the reporting also includes the last row their "upper-bound" coverage, based on their DSL (assuming all transformations supported in their DSL can be successfully synthesized).

A full version result breakdown is shown by benchmark sources. This provides a drill down on the Auto-Tables quality results, broken down by benchmark data sources (forum, notebooks, and Excel+web). Table 4 shows the performance of the three best-performing methods: Auto-Tables (AT), TabERT (TA), FlashRelate (FR), in the interest of space.

TABLE 4

Quality comparisons, broken down by data sources.

|  | Forum | | | Notebook | | | Excel + Web | | |
| --- | --- | --- | --- | --- | --- | --- | --- | --- | --- |
| Method | AT | TA | FR | AT | TA | FR | AT | TA | FR |
| Hit @ 1 | 0.521 | 0.217 | 0.043 | 0.582 | 0.215 | 0.278 | 0.554 | 0.154 | 0.489 |
| Hit @ 2 | 0.696 | 0.522 | — | 0.722 | 0.531 | — | 0.641 | 0.319 | — |
| Hit @ 3 | 0.696 | 0.565 | — | 0.747 | 0.633 | — | 0.706 | 0.451 | — |

It can be seen from Table 4 that the quality of Auto-Tables is consistent across the three, confirming its effectiveness across diverse test cases arising from different sources.

Additional results, such as a breakdown by benchmark sources, and Hit@K in the presence of input tables that are already relational (for which Auto-Tables should detect and perform no transformations), are also reported.

Quality comparisons are made in the presence of relational tables. Recall that since Auto-Tables can detect input tables that are already relational, and predict "none" for such tables, an additional use case of Auto-Tables is to invoke it on all input tables encountered in spreadsheets or on the web, which include both relational tables (requiring no transformations) and non-relational tables (requiring transformations), such that any tables that Auto-Tables predicts to require transformations can then be surfaced to users to review and approve. Note that this is a use case that by-example baselines cannot support, as they require users to first manually scan and identify tables requiring transformations.

For this purpose, Auto-Tables is tested on the 194 test cases that require transformations, as well as the corresponding 194 output tables that are already relational and require no transformations. Using this collection of 388 cases, Auto-Tables was tested to determine whether it can correctly synthesize transformations on non-relational input and also whether it can correctly predict "none" on the relational tables not requiring transformations, using the same Hit@K.

Table 5 shows Auto-Tables achieves high quality, suggesting that it does not "over-trigger" on tables that are already relational, and can be effective at this task.

TABLE 5

| Method | Auto-Tables | TaBERT | TURL |
| --- | --- | --- | --- |
| Hit @ 1 | 0.667 | 0.276 | 0.176 |
| Hit @ 2 | 0.781 | 0.584 | 0.392 |
| Hit @ 3 | 0.829 | 0.702 | 0.454 |

Table 6 shows run times by comparing the average and 50/90/95-th percentile latency, of all methods to synthesize one test case. Auto-Tables is interactive with sub-second latency on almost all cases, whose average is 0.299 s. Foofah and FlashRelate take considerably longer to synthesize, even after excluding cases that time-out after 30 minutes. This is also not counting the time that users would have to spend typing in output examples for these by-example methods, which makes Auto-Tables substantially more user-friendly for the transformation tasks.

TABLE 6

Synthesis latency per test case

| Method | Auto-tables | Foofah (excl. 89 timeout cases) | FlashRelate (excl. 91 timeout cases) |
| --- | --- | --- | --- |
| $50^{th}$ Percentile | 0.168 s | 0.326 s + human effort | 3.4 s + human effort |
| $90^{th}$ Percentile | 0.553 s | 27.146 s + human effort | 57.16 s + human effort |
| $95^{th}$ Percentile | 0.690 s | 41.411 s + human effort | 348.6 s + human effort |
| Average | 0.299 s | 6.995 s + human effort | 59.194 s + human effort |

Figure 9:
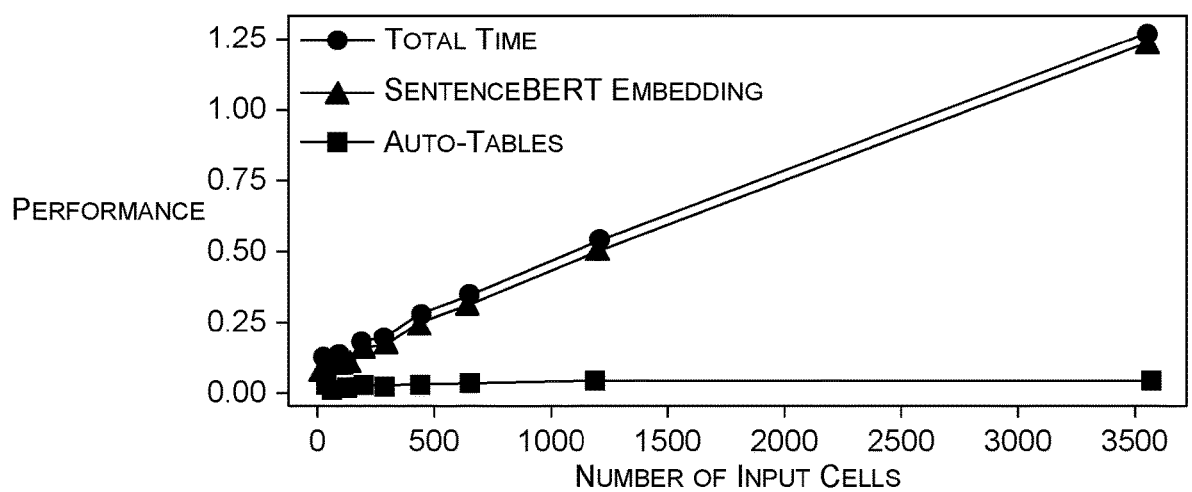
FIGS. 9-11 illustrate example graphs that are consistent with some implementations of the present concepts.

FIG. 9 shows a graph 900 of performance over number of input cells. Graph 900 reflects the average latency of Auto-Tables, on cases with different number of non-empty input cells. As shown, the latency grows linearly as the number of cells increases, but since the method only uses at most the top-left 100 rows and 50 columns to correctly synthesize a program, this is bounded by a couple of seconds at most. Furthermore, the running time is dominated by Sentence-BERT embedding, which accounts for 91.5% of the latency. In comparison, the actual inference time of Auto-Tables (line with squares) is very small and almost constant.

Table 7 shows the results of ablation studies to understand the benefit of Auto-Tables components.

TABLE 7

Ablation Studies of Auto-tables

| Method | Full | No Re-rank | No Aug | No Bert | No Syn | No Re-rank & 1 × 1 Only | 5 × 5 |
| --- | --- | --- | --- | --- | --- | --- | --- |
| Hit@1 | 0.562 | 0.51 | 0.454 | 0.474 | 0.51 | 0.49 | 0.485 |
| Hit@2 | 0.680 | 0.634 | 0.572 | 0.629 | 0.665 | 0.613 | 0.603 |
| Hit@3 | 0.722 | 0.716 | 0.66 | 0.701 | 0.696 | 0.665 | 0.649 |

The contribution of input/output re-ranking is now discussed. The contribution of re-ranking model 416 (FIGS. 4 and 8) is studied by comparing the performance of Auto-Tables with and without re-ranking. Table 7 shows that the "Full" method (with re-ranking) produces substantially better Hit@1 and Hit@2 compared to "No Re-rank."

To study the benefits of data augmentation in training data generation, augmentation was disabled when generating training data (i.e., using only the base relational tables). Table 7 shows this result under "No Aug", which suggests that the Hit@k drops substantially, underscoring the importance of data augmentation.

The testing next examines the contributions of syntactic embedding and semantic embedding. Recall that some of the implementations use both syntactic embedding and semantic embedding (sentenceBERT) to represent each cell in the data table. To understand their contributions, each embedding is removed in turn, and the results are shown under "No Bert" and "No Syntactic" in Table 7. Both results show a substantial drop in performance, confirming their importance (semantic embedding with sentenceBERT is likely more important, as removing it leads to a more significant drop).

The testing next examines the contribution of 1D Filters. Recall that some implementations employ convolution filters of size 1×1 and 1×2 to extract features from rows and columns as discussed relative to FIG. 6. To understand the effectiveness of this design, the testing evaluates the method with alternative filters. First, all the 1×2 filters are replaced with 1×1 filters, with the result labeled "1×1 Only" showing a significant drop. Second, all filters are replaced with filters of size 5×5, which is common in computer vision tasks. The result under "5×5" shows another substantial drop. Table 7 shows that both results confirm the effectiveness of the design that is tailored to data tables.

Figure 10:
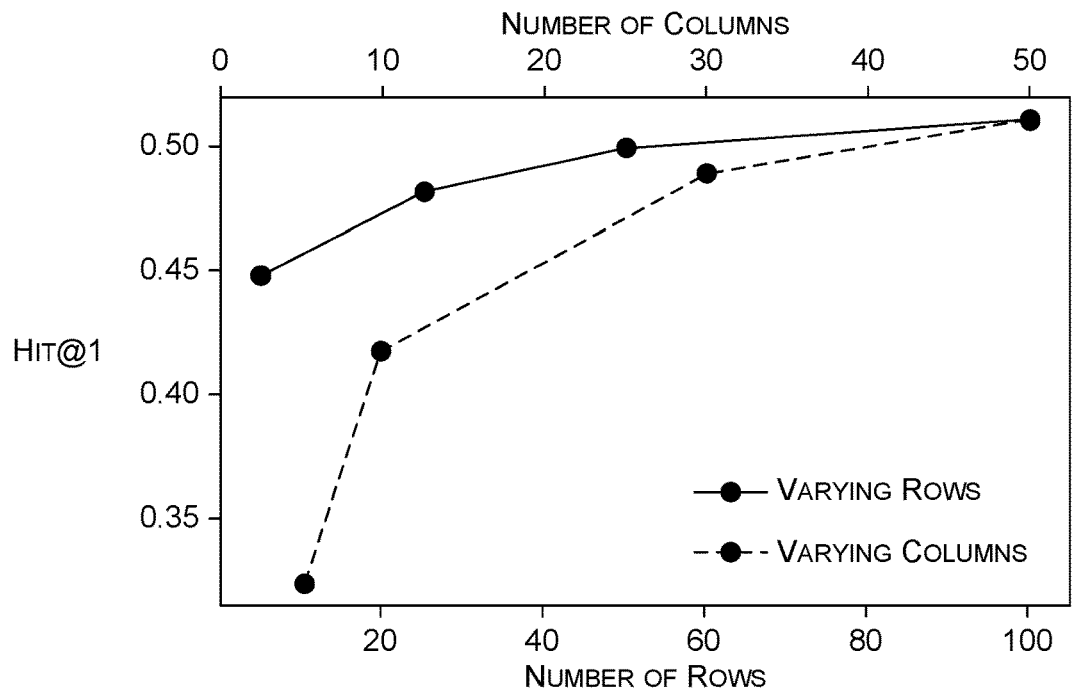

The testing next examines sensitivity analysis to understand the effect of different settings in Auto-tables. Varying input size can be tested. Some Auto-Tables versions feed the top 100 rows and left-most 50 columns from the input data table T into the model, which is typically enough to correctly predict the correct transformations. FIG. 10 shows a graph 1000 of its effect on model performance. Graph 1000 reflects varying the number of rows/columns used and shows the input-only model performance. When the number of rows/columns that the model uses are increased, the resulting quality improves until it plateaus at about 30 columns and 50 rows, in this example.

Figure 11:
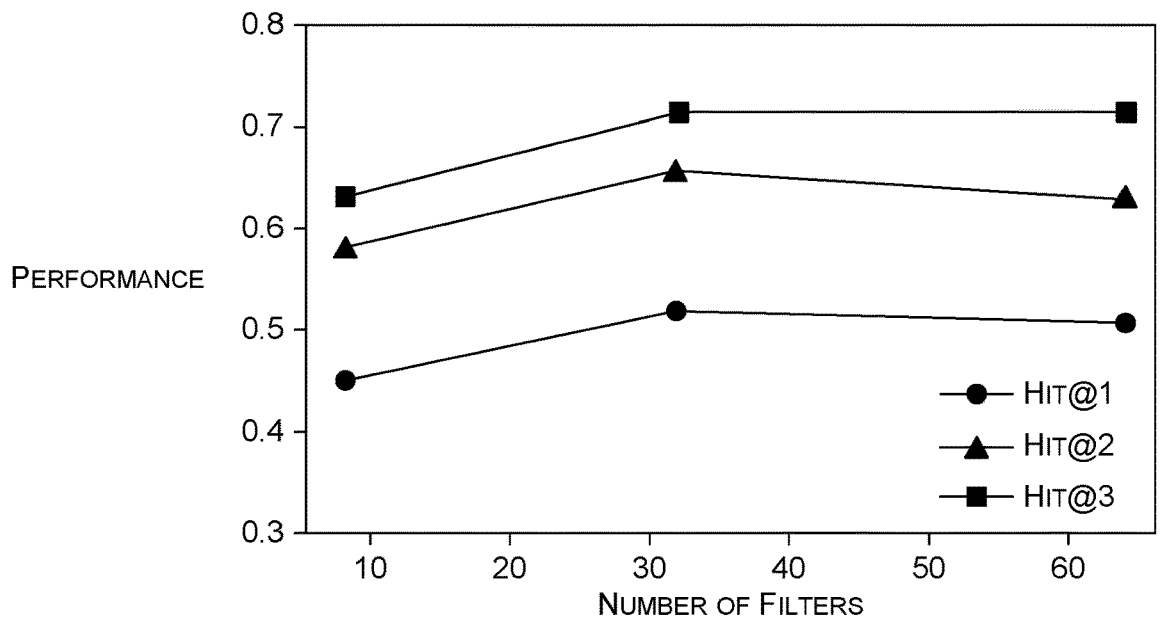

FIG. 11 shows a graph 1100 that reflects the quality of Auto-Tables input-only model with different numbers of convolution filters (the total number of 1×1 and 1×2 filters for rows/columns before AvgPool in the feature extraction layer 606 in FIG. 6). As shown in FIG. 11, using 32 filters is substantially better than 4 filters, as it can extract more features. However, the improvement from 32 filters to 64 filters is insignificant, which suggests the quality of the method reaches a plateau.

The testing next examines varying embedding methods. Some implementations initially employed the powerful (but expensive) sentenceBERT as the semantic embedding, which is known to excel in natural language processing NLP tasks. The testing explores how alternative embeddings, such as GloVe, and fastText, would perform in the task. The performance of the input-only model is shown with different embeddings in Table 8. As can be seen, Auto-Tables is interestingly not sensitive to the exact choice of semantic embedding-using sentenceBERT/GloVe/fastText achieves similar quality, suggesting that Auto-Tables can operate at a much lower latency than was shown in FIG. 9, without loss of quality.

TABLE 8

Sensitivity to different semantic embeddings.

| Embedding methods | sentenceBERT | fastText | GloVe | No Semantic |
|---|---|---|---|---|
| Hit@1 | 0.51 | 0.521 | 0.536 | 0.474 |
| Hit@2 | 0.634 | 0.644 | 0.665 | 0.629 |
| Hit@3 | 0.716 | 0.722 | 0.727 | 0.701 |
| Avg. latency per-case w/this embedding | 0.299 s | 0.052 s | 0.050 s | 0.026 s |

The testing now analyzes mistakes that the Auto-Tables model makes on 168 tables that need a single-step transformation. The testing shows the errors in both predicting operator-type and parameters.

Table 9 shows a detailed confusion matrix for single-step top-1 operator-type predictions. The most common mistakes are between "transpose" and "stack" (9), as well as "wide-to-long" and "stack" (6). Both are not unexpected, as their corresponding input tables share similar characteristics (e.g., the input in FIG. 3 may appear to look like a candidate for "transpose" as well as "stack," due to its homogeneous column groups).

TABLE 9

Confusion matrix for single-step top-1 predictions.

| | Pred | | | | | | | |
|---|---|---|---|---|---|---|---|---|
| True | trans. | stack | wtl | explode | ffill | pivot | subtitle | none |
| trans. | 12 | 9 | 0 | 1 | 0 | 0 | 0 | 0 |
| stack | 2 | 24 | 1 | 0 | 0 | 0 | 0 | 8 |
| wtl | 0 | 6 | 21 | 0 | 0 | 0 | 0 | 4 |
| explode | 0 | 0 | 0 | 19 | 0 | 0 | 0 | 14 |
| ffill | 0 | 1 | 0 | 1 | 8 | 0 | 0 | 3 |
| pivot | 0 | 0 | 0 | 0 | 0 | 8 | 0 | 0 |
| subtitle | 0 | 1 | 0 | 0 | 0 | 0 | 24 | 1 |

Table 10 shows the accuracy of the parameter predictions for different operators at the top-1 position. Despite the large space of possible parameters, the predictions are surprisingly accurate, showing the effectiveness of the CNN-inspired model in extracting patterns from tabular data.

TABLE 10

Accuracy of operator parameter predictions.

| | operator | | | | | | |
|---|---|---|---|---|---|---|---|
| parameter | stack start-idx | stack end-idx | wtl start-idx | wtl end-idx | explode col-idx | ffill col-idx | pivot row-freq |
| Accuracy | 0.958 | 1 | 0.952 | 1 | 0.947 | 1 | 0.875 |

The Auto-Tables concepts described above provide a technical solution to automatically relationalize data tables without examples, which addresses a common pain point for both technical and non-technical users, when they deal with data tables in the wild outside of relational database settings. Auto-Tables learns-to-synthesize transformations, using a computer-vision inspired model architecture that exploits the common "visual" patterns in data tables. The Auto-Tables concepts include a self-supervision framework unique in the data table transformation setting to overcome the lack of training data, by exploiting the inverse functional relationships between operators to auto-generate training data, obviating the expensive process of human labeling. Extensive testing benchmarks are shown for this task by collecting 194 real test cases from user spreadsheets and online forums. Evaluation suggests that Auto-Tables can successfully synthesize transformations for over 70% of test cases at interactive speeds (with sub-second latency).

Figure 12:
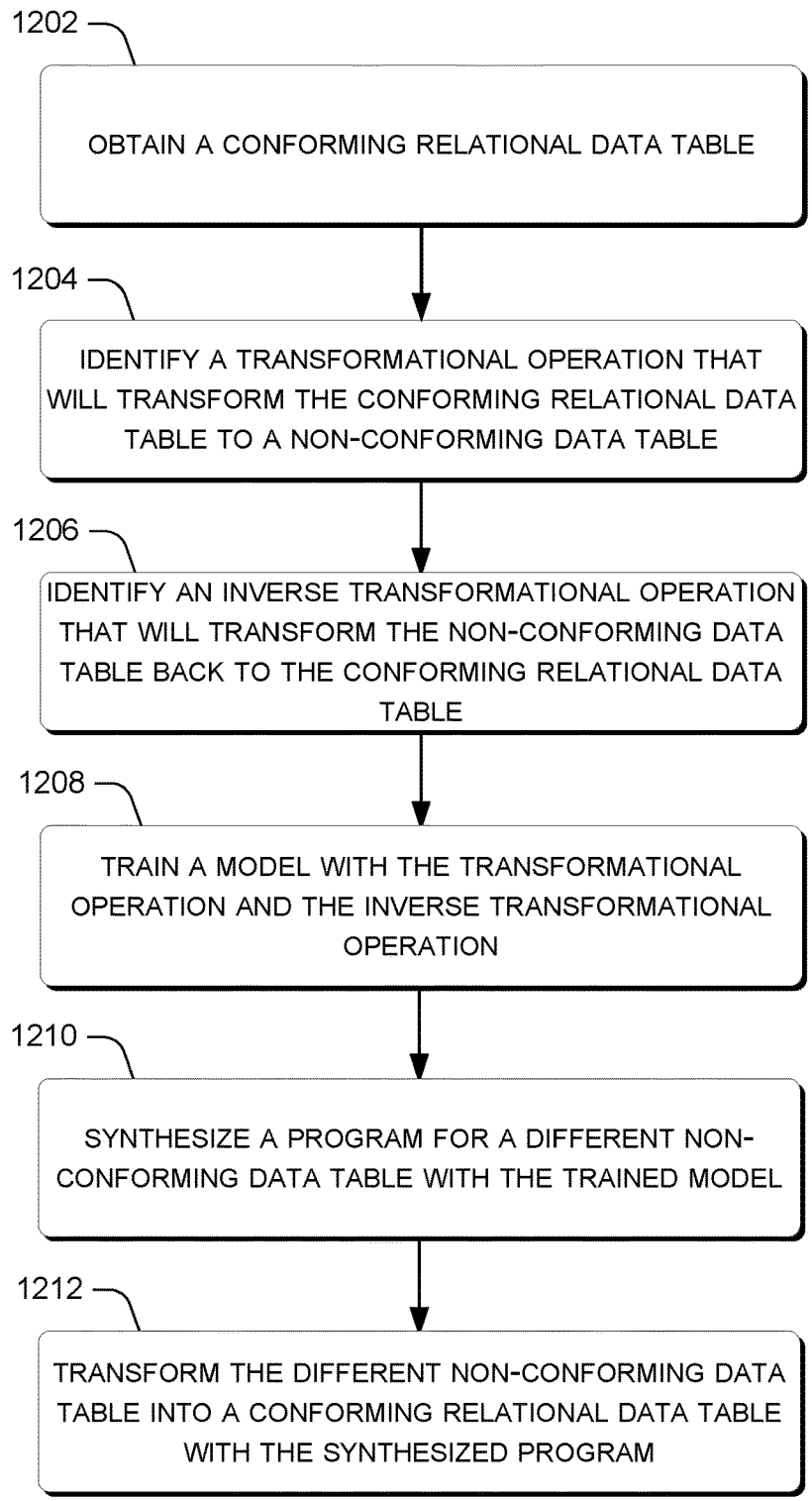
FIG. 12 illustrates an example flowchart that is consistent with some implementations of the present concepts.

Several implementations are described in detail above. FIG. 12 shows a flowchart of an additional example method. At block 1202, the method can obtain a conforming relational data table.

At block 1204, the method can identify a transformational operation that will transform the conforming relational data table to a non-conforming data table.

At block 1206, the method can identify an inverse transformational operation that will transform the non-conforming data table back to the conforming relational data table.

At block 1208, the method can train a model with the transformational operation and the inverse transformational operation. In some cases, the conforming relational data table and the non-conforming data table can also be used to train the model.

At block 1210, the method can synthesize a program for a different non-conforming data table with the trained model.

At block 1212, the method can transform the different non-conforming data table into a conforming relational data table with the synthesized program. Note that in some cases, the different non-conforming data table may be one of many input tables that may or may not be conforming. The method can recognize if the input table is already a conforming relational data table. If so, the method will not perform a transformation and can instead apply a "none" operation. Thus, the method could be applied to a group of data tables, such as all of a user's data tables and/or data tables from the Internet. The method could evaluate the group of data tables and perform transformations to any non-conforming data tables so that all data tables of the group are conforming relational data tables that can be effectively queried without any additional human effort.

The order in which the disclosed methods are described is not intended to be construed as a limitation, and any number of the described acts can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Figure 13:
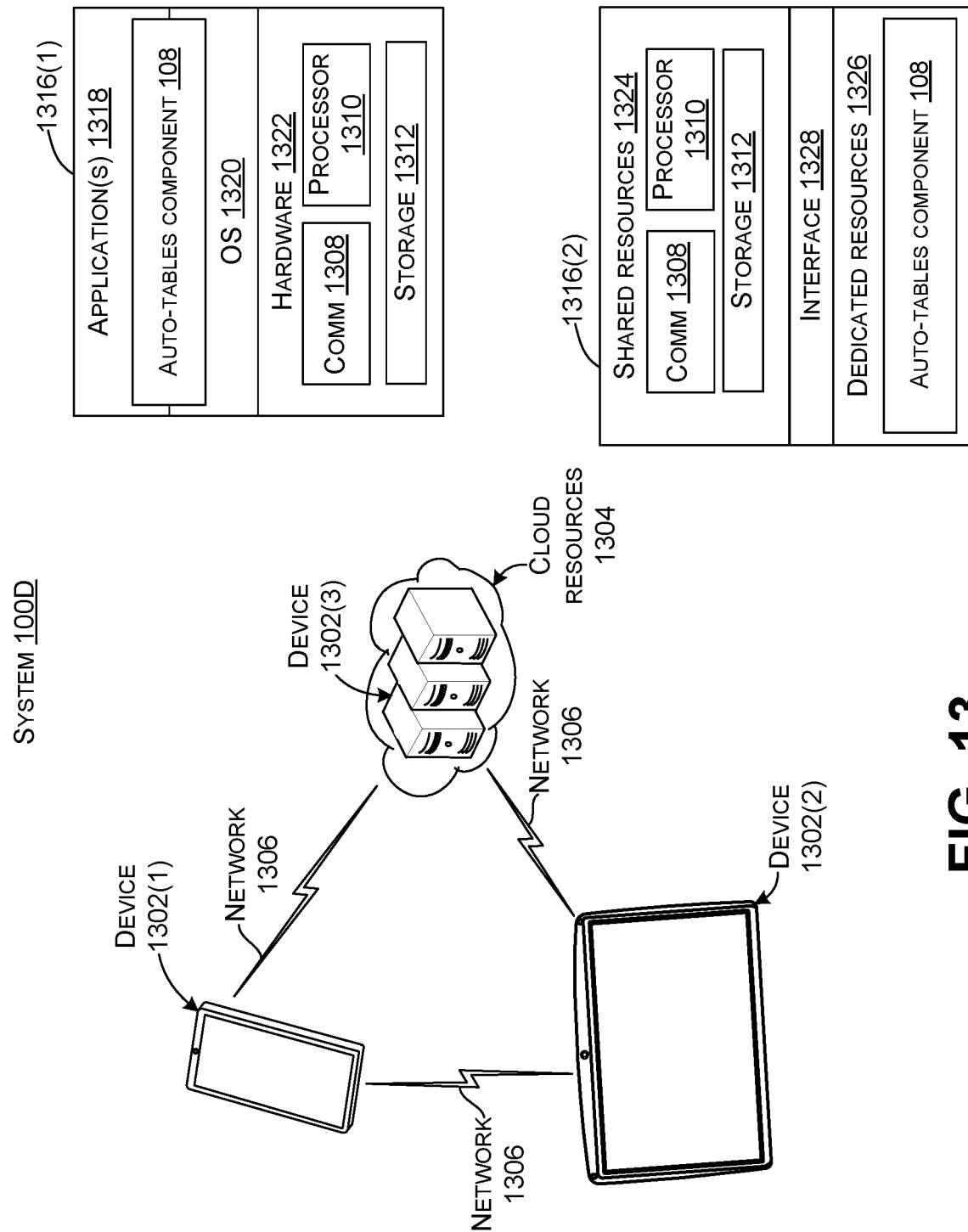

FIG. 13 shows an example system 100D. System 100D can include computing devices 1302. In the illustrated configuration, computing device 1302 (1) is manifest as a smartphone, computing device 1302 (2) is manifest as a tablet type device, and computing device 1302 (3) is manifest as a server type computing device, such as may be found in a datacenter as a cloud resource 1304. Computing devices 1302 can be coupled via one or more networks 1306 that are represented by lightning bolts.

Computing devices 1302 can include a communication component 1308, a processor 1310, storage resources (e.g., storage) 1312, and/or Auto-Tables component 108.

The Auto-Tables component 108 can be configured to manage model training and usage of the trained model to transform non-conforming data tables (and/or data tables of unknown status) to conforming relational data tables. The Auto-Tables component can also generate UIs that allow users to indicate data tables that they want evaluated and transformed if required. In some cases, the Auto-Tables component 108 may automatically perform the transformations without user review. In other cases, the Auto-Tables component 108 may present the input tables (e.g., non-conforming data tables), transformations and/or output tables (e.g., conforming relational data tables) on the UI for user approval.

FIG. 13 shows two device configurations 1316 that can be employed by computing devices 1302. Individual computing devices 1302 can employ either configuration 1316 (1) or 1316 (2), or an alternate configuration. (Due to space constraints on the drawing page, one instance of each configuration is illustrated). Briefly, device configuration 1316 (1) represents an operating system (OS) centric configuration. Device configuration 1316 (2) represents a system on a chip (SOC) configuration. Device configuration 1316 (1) is organized into one or more applications 1318, operating system 1320, and hardware 1322. Device configuration 1316 (2) is organized into shared resources 1324, dedicated resources 1326, and an interface 1328 therebetween.

In configuration 1316 (1), the Auto-Tables component 108 can be manifest as part of the operating system 1320. Alternatively, the Auto-Tables component 108 can be manifest as part of the applications 1318 that operates in conjunction with the operating system 1320 and/or processor 1310. In configuration 1316 (2), the Auto-Tables component 108 can be manifest as part of the processor 1310 or a dedicated resource 1326 that operates cooperatively with the processor 1310.

In some configurations, each of computing devices 1302 can have an instance of the Auto-Tables component 108. However, the functionalities that can be performed by the Auto-Tables component 108 may be the same or they may be different from one another when comparing computing devices. For instance, in some cases, each Auto-Tables component 108 can be robust and provide all of the functionality described above and below (e.g., a device-centric implementation).

In other cases, some devices can employ a less robust instance of the Auto-Tables component 108 that relies on some functionality to be performed by an Auto-Tables component 108 on another device. In one such instance, Auto-Tables component 108 on device 1302 (3) (e.g., on cloud resources 1304) may oversee model training (e.g., self-supervised training data generation 102 and model training 104 of FIG. 1). The Auto-Tables component 108 on device 1302 (3) and/or Auto-Tables components 108 on device 1302 (1) and/or 1302 (2) could apply the trained model for transformation of non-conforming data tables (e.g., automatic conversion 106 of FIG. 1).

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on/in storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 1316 (2) can be thought of as a system on a chip (SOC) type design. In such a case, functionality provided by the device can be integrated on a single SOC or multiple coupled SOCs. One or more processors 1310 can be configured to coordinate with shared resources 1324, such as storage 1312, etc., and/or one or more dedicated resources 1326, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, hardware processing units, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU, CPUs, GPU or GPUs). The program code can be stored in one or more computer-readable memory devices, such as computer-readable storage media. The features and techniques of the components are platform-independent, meaning that they may be implemented on a variety of commercial computing platforms having a variety of processing configurations.

Additional Examples

Various examples are described above. Additional examples are described below. One example includes a method comprising obtaining a conforming relational data table, identifying a transformational operation that will transform the conforming relational data table to a non-conforming data table, identifying an inverse transformational operation that will transform the non-conforming data table back to the conforming relational data table, training a model with the transformational operation and the inverse transformational operation, synthesizing a program for a different non-conforming data table with the trained model, and transforming the different non-conforming data table into a conforming relational data table with the synthesized program.

Another example can include any of the above and/or below examples where identifying a transformational operator comprises selecting the transformational operator from a set of transformational operators.

Another example can include any of the above and/or below examples where identifying a transformational operator comprises identifying a single transformational operator or multiple serially performed transformational operators.

Another example can include any of the above and/or below examples where identifying an inverse transformational operator comprises identifying a single inverse transformational operator or multiple serially performed inverse transformational operators.

Another example can include any of the above and/or below examples where the obtaining comprises obtaining multiple conforming relational data tables, and wherein identifying a transformational operation and identifying an inverse transformational operation are performed on each of the multiple conforming relational data tables.

Another example can include any of the above and/or below examples where the training the model comprises training the model utilizing the transformational operation and the inverse transformational operation from each of the multiple conforming relational data tables.

Another example can include any of the above and/or below examples where training a model comprises training the model with the conforming relational data table the non-conforming data table the transformational operation and the inverse transformational operation and without any human labeled training data.

Another example can include any of the above and/or below examples where the obtaining a conforming relational data table, identifying a transformational operation, identifying an inverse transformational operation and training a model are performed prior to receiving the different non-conforming data table.

Another example can include any of the above and/or below examples where the method further comprises generating a user interface and receiving the different non-conforming data table through the user interface.

Another example can include any of the above and/or below examples where the method further comprises presenting the transforming of the different non-conforming data table into a conforming relational data table on the user interface.

Another example includes a system comprising a processor and a storage resource storing computer-readable instructions which, when executed by the processor, cause the processor to obtain conforming relational data tables, generate training data without human labelling by identifying a transformational operator that will transform an individual conforming relational data table to a non-conforming data table and an inverse transformational operator that will transform the non-conforming data table back to the individual conforming relational data table, and train a model with the training data.

Another example can include any of the above and/or below examples where the processor is further configured to synthesize programs with the model for other individual conforming relational data tables.

Another example can include any of the above and/or below examples where the processor is further configured to rank the synthesized programs.

Another example can include any of the above and/or below examples where the processor is further configured to re-rank the synthesized programs with input-output re-ranking.

Another example can include any of the above and/or below examples where the processor is further configured to receive an additional data table, utilize the model to synthesize a program to transform the additional data table into a conforming relational data table.

Another example can include any of the above and/or below examples where the processor is further configured to cause a user interface to be generated and to receive the additional data table via the user interface.

Another example includes a computing device comprising hardware and an Auto-Tables component configured to utilize a trained model to synthesize a program to transform an input data table into a conforming relational data table.

Another example can include any of the above and/or below examples where the Auto-Tables component is further configured to cause a user interface to be generated and to receive the input data table via the user interface.

Another example can include any of the above and/or below examples where the Auto-Tables component is further configured to cause the transformation of the input data table into the conforming relational data table to be presented on the user interface.

Another example can include any of the above and/or below examples where the Auto-Tables component is further configured to recognize if the input data table is already a conforming relational data table and to not transform the input table.

CONCLUSION

The description includes novel Auto-Tables concepts. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method comprising:
obtaining a conforming relational data table that conforms to a relational format;
generating a training example by performing a first transformational operation on the conforming relational data table, the first transformational operation resulting in a non-conforming data table that is formatted differently than the relational format;
identifying a second transformational operation that will transform the non-conforming data table back to the conforming relational data table;
training a machine learning model with the training example to obtain a trained machine learning model, the training involving evaluating a loss function to determine weights of the trained machine learning model, the loss function being based at least on whether the machine learning model correctly predicts the second transformational operation that will transform the non-conforming data table back to the conforming relational data table;
synthesizing, with the trained machine learning model, a program for a different non-conforming data table that is formatted differently than the relational format; and,
transforming, with the synthesized program, the different non-conforming data table into another conforming relational data table that conforms to the relational format.

2. The method of claim 1, further comprising:
selecting the first transformational operation from a set of transformational operators.

3. The method of claim 1, wherein selecting the first transformational operation comprises selecting a single transformational operator or multiple serially performed transformational operators.

4. The method of claim 3, wherein identifying the second transformational operation comprises identifying a single inverse transformational operator or multiple serially performed inverse transformational operators.

5. The method of claim 1, wherein the obtaining comprises obtaining multiple conforming relational data tables and training examples are generated from each of the multiple conforming relational data tables.

6. The method of claim 5, wherein the training the machine learning model comprises training the machine learning model utilizing the training examples generated from the multiple conforming relational data tables.

7. The method of claim 1, wherein training the machine learning model comprises training the machine learning model without a human-provided label for the training example.

8. The method of claim 1, wherein the machine learning model is trained prior to receiving the different non-conforming data table.

9. The method of claim 8, further comprising:
generating a user interface; and
receiving input identifying the different non-conforming data table through the user interface.

10. The method of claim 9, further comprising:
presenting the transforming of the different non-conforming data table into the another conforming relational data table on the user interface.

11. The method of claim 1, the trained machine learning model comprising an embedding layer and a convolutional layer.

12. A system, comprising:
a processor; and,
a storage resource storing computer-readable instructions which, when executed by the processor, cause the processor to:
obtain conforming relational data tables that are formatted in a relational format;
generate training data without human labelling by identifying:
a transformational operator that will transform an individual conforming relational data table to a non-conforming data table that is formatted differently than the relational format, and
an inverse transformational operator that will transform the non-conforming data table back to the individual conforming relational data table that is formatted in the relational format; and,
train a machine learning model with the training data by evaluating a loss function to determine weights of the trained machine learning model, the loss function being based at least on whether the machine learning model correctly predicts the inverse transformational operation that will transform the individual non-conforming data table back to the conforming relational data table.

13. The system of claim 12, wherein the processor is further configured to synthesize programs with the trained machine learning model for other individual conforming relational data tables.

14. The system of claim 13, wherein the processor is further configured to rank the synthesized programs.

15. The system of claim 14, wherein the processor is further configured to re-rank the synthesized programs with input-output re-ranking.

16. The system of claim 15, wherein the processor is further configured to receive an additional data table and utilize the trained machine learning model to synthesize a program to transform the additional data table into a conforming relational data table.

17. The system of claim 16, wherein the processor is further configured to cause a user interface to be generated and to receive the additional data table via the user interface.

18. A computing device, comprising:
hardware; and,
an Auto-Tables component configured to utilize a trained machine learning model to synthesize a program to transform a particular input data table into a particular conforming relational data table,
wherein, prior to synthesizing the program, the trained machine learning model has been trained by evaluating a loss function to determine weights of the trained machine learning model, the loss function being based at least on whether the machine learning model correctly predicts operations that will transform other non-conforming data tables into other conforming relational data tables,
wherein the particular conforming relational data table is in a relational format, and
wherein the particular input data table is in a different format than the relational format.

19. The computing device of claim 18, wherein the Auto-Tables component is further configured to cause a user interface to be generated and to receive input identifying the particular input data table via the user interface.

20. The computing device of claim 19, wherein the Auto-Tables component is further configured to cause the transformation of the particular input data table into the particular conforming relational data table to be presented on the user interface.

21. The computing device of claim 18, wherein the Auto-Tables component is further configured to recognize that another input data table is already a conforming relational data table and to not transform the another input data table.

* * * * *